US008631869B2

(12) United States Patent
Sierra et al.

(10) Patent No.: US 8,631,869 B2
(45) Date of Patent: *Jan. 21, 2014

(54) METHODS USEFUL FOR CONTROLLING FLUID LOSS IN SUBTERRANEAN TREATMENTS

(76) Inventors: Leopoldo Sierra, Houston, TX (US); Eldon D. Dalrymple, Duncan, OK (US); Larry S. Eoff, Duncan, OK (US); Barireddy R. Reddy, Duncan, OK (US); Matthew E. Blauch, Duncan, OK (US); Mark A. Parker, Marlow, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/102,062

(22) Filed: Apr. 8, 2005

(65) Prior Publication Data

US 2005/0199396 A1    Sep. 15, 2005

Related U.S. Application Data

(63) Continuation-in-part of application No. 10/881,198, filed on Jun. 29, 2004, now Pat. No. 7,117,942, and a continuation-in-part of application No. 10/760,443, filed on Jan. 20, 2004, now Pat. No. 7,759,292, which is a continuation-in-part of application No. 10/440,337, filed on May 16, 2003, now abandoned, and a continuation-in-part of application No. 10/612,271, filed on Jul. 2, 2003, now Pat. No. 7,182,136.

(51) Int. Cl.
*E21B 43/22* (2006.01)
*E21B 43/26* (2006.01)

(52) U.S. Cl.
USPC ........................................ 166/282; 166/305.1

(58) Field of Classification Search
None
See application file for complete search history.

(56) References Cited

U.S. PATENT DOCUMENTS

| | | | |
|---|---|---|---|
| 2,278,838 A | 4/1942 | Groote et al. | |
| 2,670,329 A | 2/1954 | Jones | |
| 2,687,375 A | 8/1954 | Fischer et al. | |
| 2,689,244 A | 9/1954 | Jones | |
| 2,819,278 A | 1/1958 | De Groots et al. | |
| 2,843,573 A | 7/1958 | Melamed | 526/260 |
| 2,863,832 A | 12/1958 | Perrine | 252/8.55 |
| 2,877,179 A | 3/1959 | Hughes et al. | |
| 2,910,436 A | 10/1959 | Fatt et al. | 252/8.55 |
| 3,008,898 A | 11/1961 | Hughes et al. | |
| 3,052,298 A | 9/1962 | Mallot | |
| 3,065,247 A | 11/1962 | De Groots et al. | |
| 3,138,205 A | 6/1964 | Kerver et al. | |
| 3,215,199 A | 11/1965 | Dilgren | 166/38 |
| 3,251,415 A | 5/1966 | Bombardieri et al. | 166/42 |
| 3,251,778 A | 5/1966 | Dickson et al. | 252/82 |
| 3,258,428 A | 6/1966 | Dickson | 252/180 |
| 3,265,512 A | 8/1966 | Dickson | 106/14 |
| 3,271,307 A | 9/1966 | Dickson et al. | 300/152 |
| 3,297,090 A | 1/1967 | Dilgren | 166/38 |
| 3,307,630 A | 3/1967 | Dilgren et al. | 166/38 |
| 3,326,890 A | 6/1967 | Engelskirchen et al. | |
| 3,336,980 A | 8/1967 | Rike | |
| 3,347,789 A | 10/1967 | Dickson | 252/9.55 |
| 3,382,924 A | 5/1968 | Veley et al. | 166/42 |
| 3,404,114 A | 10/1968 | Walter et al. | 524/812 |
| 3,434,971 A | 3/1969 | Atkins | 252/8.55 |
| 3,441,085 A | 4/1969 | Gidley | 166/307 |
| 3,451,818 A | 6/1969 | Wareham | 96/78 |
| 3,489,222 A | 1/1970 | Millhone et al. | |
| 3,601,194 A * | 8/1971 | Gallus | 166/283 |
| 3,615,794 A | 10/1971 | Nimerick | |
| 3,637,656 A | 1/1972 | Germino et al. | |
| 3,647,507 A | 3/1972 | Ashcraft | |
| 3,647,567 A | 3/1972 | Schweri et al. | 428/463 |
| 3,689,418 A | 9/1972 | Cenci et al. | |
| 3,689,468 A | 9/1972 | Cenci et al. | 526/312 |
| 3,708,013 A | 1/1973 | Dismukes | |
| 3,709,298 A | 1/1973 | Pramann | |
| 3,744,566 A | 7/1973 | Szabo et al. | 166/275 |
| 3,818,991 A | 6/1974 | Nimerick | |
| 3,902,557 A | 9/1975 | Shaughnessy et al. | |
| 3,910,862 A | 10/1975 | Barabas et al. | 260/79.3 MU |
| 3,943,060 A | 3/1976 | Martin et al. | |
| 3,983,941 A | 10/1976 | Fitch | |

(Continued)

FOREIGN PATENT DOCUMENTS

DE    2 250 552    4/1974
EP    0 383 337 A2    8/1990

(Continued)

OTHER PUBLICATIONS

U.S. Appl. No. 10/780,995, filed Feb. 18, 2004, Eoff, et al.
U.S. Appl. No. 10/806,894, filed Mar. 23, 2004, Eoff et al.
U.S. Appl. No. 10/825,001, filed Apr. 15, 2004, Eoff, et al.
U.S. Appl. No. 10/872,997, filed Jun. 21, 2004, Eoff, et al.
U.S. Appl. No. 10/881,198, filed Jun. 29, 2004, Dalrymple, et al.
U.S. Appl. No. 10/893,210, filed Jul. 16, 2004, Eoff, et al.

(Continued)

*Primary Examiner* — Angela M DiTrani

(57) ABSTRACT

Provided are methods of using fluid loss control additives that comprise a water-soluble polymer with hydrophobic or hydrophilic modification. In one embodiment, a method of providing at least some degree of fluid loss control during a subterranean treatment is provided. In an example of such a method, the method may comprise providing a treatment fluid comprising an aqueous liquid and a fluid loss control additive, the fluid loss control additive comprising a water-soluble polymer with hydrophobic or hydrophilic modification; and introducing the treatment fluid into a well bore that penetrates a subterranean formation, wherein there is at least a partial reduction in fluid loss into at least a portion of the subterranean formation from the treatment fluid and/or another aqueous fluid introduced into well bore subsequent to the treatment fluid.

8 Claims, 6 Drawing Sheets

(56) References Cited

U.S. PATENT DOCUMENTS

| | | | |
|---|---|---|---|
| 4,029,544 A | 6/1977 | Jarowenko et al. | |
| 4,052,343 A | 10/1977 | Cunningham | 521/32 |
| 4,052,345 A | 10/1977 | Austin et al. | |
| 4,129,183 A | 12/1978 | Kalfoglou | 166/300 |
| 4,129,534 A | 12/1978 | Cunningham | 521/38 |
| 4,142,595 A | 3/1979 | Anderson et al. | |
| 4,152,274 A | 5/1979 | Phillips et al. | |
| 4,158,521 A | 6/1979 | Anderson et al. | 405/264 |
| 4,158,726 A | 6/1979 | Kamada et al. | 526/200 |
| 4,228,277 A | 10/1980 | Landoll | |
| 4,299,710 A | 11/1981 | Dupre et al. | 252/8.5 A |
| 4,306,981 A | 12/1981 | Blair, Jr. | |
| 4,337,828 A | 7/1982 | Blair, Jr. | |
| 4,366,071 A | 12/1982 | McLaughlin et al. | 252/8.55 R |
| 4,366,072 A | 12/1982 | McLaughlin et al. | 252/8.55 R |
| 4,366,073 A | 12/1982 | McLaughlin et al. | 252/8.55 R |
| 4,366,074 A | 12/1982 | McLaughlin et al. | 252/8.55 R |
| 4,374,739 A | 2/1983 | McLaughlin et al. | 252/8.55 R |
| 4,393,939 A | 7/1983 | Smith et al. | 166/293 |
| 4,395,340 A | 7/1983 | McLaughlin | 252/8.55 D |
| 4,401,789 A | 8/1983 | Gideon | 524/827 |
| 4,409,110 A | 10/1983 | Borchardt et al. | |
| 4,439,334 A | 3/1984 | Borchardt | 252/8.55 D |
| 4,440,649 A | 4/1984 | Loftin et al. | 252/8.5 C |
| 4,441,556 A | 4/1984 | Powers et al. | |
| 4,447,342 A | 5/1984 | Borchardt et al. | 252/8.55 D |
| 4,460,627 A | 7/1984 | Weaver et al. | |
| 4,462,718 A | 7/1984 | McLaughlin et al. | 405/264 |
| 4,499,214 A | 2/1985 | Sortwell | |
| 4,532,052 A * | 7/1985 | Weaver et al. | 507/222 |
| 4,536,297 A | 8/1985 | Loftin et al. | 252/8.5 C |
| 4,536,303 A | 8/1985 | Borchardt | 252/8.55 R |
| 4,536,305 A | 8/1985 | Borchardt et al. | |
| 4,552,670 A | 11/1985 | Lipowski et al. | 704/553 |
| 4,554,081 A | 11/1985 | Borchardt et al. | 252/8.5 A |
| 4,563,292 A | 1/1986 | Borchardt | 252/8.55 R |
| 4,604,216 A | 8/1986 | Irvin et al. | 252/8.51 |
| 4,608,139 A | 8/1986 | Craun et al. | 428/457 |
| 4,619,776 A | 10/1986 | Mondshine | |
| 4,625,802 A | 12/1986 | Sydansk | |
| 4,627,926 A | 12/1986 | Peiffer et al. | |
| 4,631,138 A | 12/1986 | Johns et al. | |
| 4,671,883 A | 6/1987 | Connell | 252/8.515 |
| 4,693,639 A | 9/1987 | Hollenbeak et al. | 405/263 |
| 4,699,722 A | 10/1987 | Dymond et al. | 252/8.551 |
| 4,702,319 A | 10/1987 | Bock et al. | |
| 4,730,028 A | 3/1988 | Bock et al. | 526/225 |
| 4,814,096 A | 3/1989 | Evani | 252/8.554 |
| 4,828,725 A | 5/1989 | Lai et al. | |
| 4,828,726 A | 5/1989 | Himes et al. | 252/8.553 |
| 4,856,590 A | 8/1989 | Caillier | |
| 4,870,167 A | 9/1989 | Zody et al. | |
| 4,941,537 A | 7/1990 | Langemeier et al. | |
| 4,956,104 A | 9/1990 | Cowan et al. | |
| 4,959,432 A | 9/1990 | Fan et al. | 526/287 |
| 4,960,876 A | 10/1990 | Molteni et al. | |
| 4,993,448 A | 2/1991 | Karydas et al. | |
| 5,051,197 A | 9/1991 | Kalfayan et al. | |
| 5,071,934 A | 12/1991 | Peiffer | 526/307 |
| 5,097,904 A | 3/1992 | Himes | 166/294 |
| 5,105,886 A | 4/1992 | Strubhar et al. | |
| 5,146,986 A | 9/1992 | Dalrymple | 166/294 |
| 5,160,642 A | 11/1992 | Schield et al. | 252/8.551 |
| 5,197,544 A | 3/1993 | Himes | 166/294 |
| 5,208,216 A | 5/1993 | Williamson et al. | 507/120 |
| 5,244,042 A | 9/1993 | Dovan et al. | 166/270 |
| 5,248,665 A | 9/1993 | Hale et al. | |
| 5,256,651 A | 10/1993 | Phelps et al. | |
| 5,271,466 A | 12/1993 | Harms | 166/300 |
| 5,342,530 A | 8/1994 | Aften et al. | 252/8.551 |
| 5,379,841 A | 1/1995 | Pusch et al. | 166/295 |
| 5,382,371 A | 1/1995 | Stahl et al. | 507/221 |
| 5,407,909 A | 4/1995 | Goodhue, Jr. et al. | |
| 5,424,284 A | 6/1995 | Patel et al. | |
| 5,445,223 A | 8/1995 | Nelson et al. | |
| 5,473,059 A | 12/1995 | Yeh | |
| 5,482,116 A | 1/1996 | El-Rabaa et al. | |
| 5,566,760 A | 10/1996 | Harris | |
| 5,597,783 A | 1/1997 | Audibert et al. | 507/120 |
| 5,607,902 A | 3/1997 | Smith et al. | 507/120 |
| 5,637,556 A | 6/1997 | Argillier et al. | 507/120 |
| 5,643,460 A | 7/1997 | Marble et al. | |
| 5,646,093 A | 7/1997 | Dino | |
| 5,663,123 A | 9/1997 | Goodhue, Jr. et al. | |
| 5,669,456 A | 9/1997 | Audibert et al. | 175/72 |
| 5,681,796 A | 10/1997 | Nimerick | |
| 5,704,426 A | 1/1998 | Rytlewski et al. | |
| 5,720,347 A | 2/1998 | Audibert et al. | 166/294 |
| 5,728,653 A | 3/1998 | Audibert et al. | 507/222 |
| 5,735,349 A | 4/1998 | Dawson et al. | 166/295 |
| 5,755,286 A | 5/1998 | Ebinger | |
| 5,887,653 A | 3/1999 | Bishop et al. | 166/281 |
| 5,908,814 A | 6/1999 | Patel et al. | |
| 5,944,106 A | 8/1999 | Dalrymple et al. | 166/281 |
| 5,972,848 A | 10/1999 | Audibert et al. | 507/119 |
| 5,979,557 A | 11/1999 | Card et al. | 166/300 |
| 5,990,052 A | 11/1999 | Harris | |
| 6,020,289 A | 2/2000 | Dymond | |
| 6,047,773 A | 4/2000 | Zeltmann et al. | |
| 6,070,664 A | 6/2000 | Dalrymple et al. | 166/281 |
| 6,124,245 A | 9/2000 | Patel | 507/120 |
| 6,162,766 A | 12/2000 | Muir et al. | |
| 6,187,839 B1 | 2/2001 | Eoff et al. | 523/130 |
| 6,194,356 B1 | 2/2001 | Jones et al. | |
| 6,209,646 B1 | 4/2001 | Reddy et al. | |
| 6,228,812 B1 | 5/2001 | Dawson et al. | 507/221 |
| 6,237,687 B1 | 5/2001 | Barbee, Jr. et al. | 166/278 |
| 6,242,390 B1 | 6/2001 | Mitchell et al. | |
| 6,248,697 B1 | 6/2001 | Goodhue, Jr. et al. | |
| 6,253,851 B1 | 7/2001 | Schroeder, Jr. et al. | 166/278 |
| 6,277,900 B1 | 8/2001 | Oswald et al. | 523/130 |
| 6,281,172 B1 | 8/2001 | Warren et al. | |
| 6,283,210 B1 | 9/2001 | Soliman et al. | 166/270 |
| 6,291,404 B2 | 9/2001 | House | |
| 6,358,889 B2 | 3/2002 | Waggenspack et al. | |
| 6,359,047 B1 | 3/2002 | Thieu et al. | 524/376 |
| 6,364,016 B1 | 4/2002 | Dalrymple et al. | 166/270 |
| 6,380,137 B1 | 4/2002 | Heier et al. | 507/121 |
| 6,454,003 B1 | 9/2002 | Chang et al. | |
| 6,476,169 B1 * | 11/2002 | Eoff et al. | 526/307.2 |
| 6,476,283 B1 | 11/2002 | Devore et al. | 585/250 |
| 6,497,283 B1 | 12/2002 | Eoff et al. | 166/293 |
| 6,516,885 B1 | 2/2003 | Munday | 166/295 |
| 6,520,255 B2 | 2/2003 | Tolman et al. | |
| 6,562,762 B2 | 5/2003 | Cowan et al. | |
| 6,601,648 B2 | 8/2003 | Ebinger | |
| 6,605,570 B2 | 8/2003 | Miller et al. | |
| 6,607,035 B1 | 8/2003 | Reddy et al. | |
| 6,609,578 B2 | 8/2003 | Patel et al. | 175/64 |
| 6,626,241 B2 | 9/2003 | Nguyen | |
| 6,627,719 B2 | 9/2003 | Whipple et al. | 774/325 |
| 6,637,517 B2 | 10/2003 | Samuel et al. | |
| 6,656,885 B2 | 12/2003 | House et al. | |
| 6,662,874 B2 * | 12/2003 | Surjaatmadja et al. | 166/308.6 |
| 6,702,044 B2 | 3/2004 | Reddy et al. | |
| 6,710,107 B2 | 3/2004 | Audibert et al. | 524/5 |
| 6,723,683 B2 | 4/2004 | Crossman et al. | |
| 6,743,288 B2 | 6/2004 | Eoff et al. | 106/724 |
| 6,756,345 B2 | 6/2004 | Pakulski et al. | |
| 6,764,981 B1 | 7/2004 | Eoff et al. | |
| 6,767,867 B2 | 7/2004 | Chatterji et al. | 507/216 |
| 6,767,869 B2 | 7/2004 | DiLullo et al. | |
| 6,780,822 B2 | 8/2004 | Cowan et al. | |
| 6,787,506 B2 | 9/2004 | Blair et al. | 507/222 |
| 6,790,812 B2 | 9/2004 | Halliday et al. | |
| 6,800,593 B2 | 10/2004 | Dobson, Jr. et al. | |
| 6,803,348 B2 * | 10/2004 | Jones et al. | 507/221 |
| 6,846,420 B2 | 1/2005 | Reddy et al. | |
| 6,855,672 B2 | 2/2005 | Poelker | 507/225 |
| 6,872,820 B2 | 3/2005 | Weber et al. | |
| 6,884,760 B1 * | 4/2005 | Brand et al. | 507/140 |
| 6,913,081 B2 | 7/2005 | Powell et al. | |
| 6,962,203 B2 | 11/2005 | Funchess | |
| 6,978,836 B2 | 12/2005 | Nguyen et al. | |

(56) References Cited

U.S. PATENT DOCUMENTS

| | | | |
|---|---|---|---|
| 6,981,552 B2 | 1/2006 | Reddy et al. | |
| 7,007,752 B2 | 3/2006 | Reddy et al. | |
| 7,008,908 B2 | 3/2006 | Chan et al. | |
| 7,036,587 B2 | 5/2006 | Munoz, Jr. et al. | |
| 7,036,589 B2 | 5/2006 | Nguyen | |
| 7,081,439 B2 | 7/2006 | Sullivan et al. | |
| 7,087,554 B2 | 8/2006 | Youngson et al. | |
| 7,091,159 B2 | 8/2006 | Eoff et al. | 507/120 |
| 7,114,568 B2 | 10/2006 | Eoff et al. | 166/291 |
| 7,117,942 B2 | 10/2006 | Dalrymple et al. | 166/278 |
| 7,159,656 B2 | 1/2007 | Eoff et al. | 166/295 |
| 7,178,610 B2 | 2/2007 | Bell | |
| 7,182,136 B2 | 2/2007 | Dalrymple et al. | 166/281 |
| 7,207,387 B2 | 4/2007 | Eoff et al. | |
| 7,216,707 B2 | 5/2007 | Eoff et al. | 166/294 |
| 7,220,708 B2 | 5/2007 | Zamora et al. | |
| 7,273,099 B2 | 9/2007 | East, Jr. et al. | |
| 7,398,825 B2 | 7/2008 | Nguyen et al. | |
| 7,427,583 B2 | 9/2008 | Couillet et al. | |
| 7,563,750 B2 * | 7/2009 | Eoff et al. | 507/212 |
| 7,589,048 B2 * | 9/2009 | Eoff et al. | 507/212 |
| 7,595,283 B2 * | 9/2009 | Eoff et al. | 507/212 |
| 7,632,787 B2 | 12/2009 | Mirakyan et al. | |
| 7,759,292 B2 * | 7/2010 | Eoff et al. | 507/212 |
| 8,008,235 B2 | 8/2011 | Eoff et al. | |
| 8,091,638 B2 | 1/2012 | Dusterhoft et al. | |
| 2002/0123433 A1 | 9/2002 | Goodhue, Jr. et al. | |
| 2003/0013871 A1 | 1/2003 | Mallon et al. | |
| 2003/0019627 A1 | 1/2003 | Qu et al. | 166/281 |
| 2003/0083204 A1 | 5/2003 | Chatterji et al. | |
| 2003/0094122 A1 | 5/2003 | Eoff et al. | |
| 2003/0104948 A1 | 6/2003 | Poelker et al. | 507/100 |
| 2003/0114317 A1 | 6/2003 | Benton et al. | |
| 2003/0139298 A1 | 7/2003 | Fu et al. | |
| 2003/0191030 A1 | 10/2003 | Blair et al. | 507/225 |
| 2004/0045712 A1 | 3/2004 | Eoff et al. | 166/293 |
| 2004/0102331 A1 | 5/2004 | Chan et al. | 507/100 |
| 2004/0171495 A1 | 9/2004 | Zamora et al. | 507/100 |
| 2004/0209780 A1 * | 10/2004 | Harris et al. | 507/117 |
| 2004/0220058 A1 | 11/2004 | Eoff et al. | 507/200 |
| 2004/0229756 A1 | 11/2004 | Eoff et al. | 507/219 |
| 2004/0229757 A1 | 11/2004 | Eoff et al. | 507/219 |
| 2005/0000694 A1 | 1/2005 | Dalrymple et al. | 166/307 |
| 2005/0107503 A1 | 5/2005 | Couillet et al. | |
| 2005/0194140 A1 | 9/2005 | Dalrymple et al. | |
| 2005/0230114 A1 | 10/2005 | Eoff et al. | |
| 2005/0230116 A1 | 10/2005 | Eoff et al. | |
| 2005/0284632 A1 | 12/2005 | Dalrymple et al. | |
| 2006/0016596 A1 | 1/2006 | Pauls et al. | |
| 2006/0094636 A1 * | 5/2006 | Rodrigues | 510/476 |
| 2006/0124309 A1 | 6/2006 | Nguyen et al. | |
| 2006/0137875 A1 | 6/2006 | Dusterhoft et al. | |
| 2006/0234874 A1 | 10/2006 | Eoff et al. | |
| 2006/0240994 A1 | 10/2006 | Eoff et al. | |
| 2006/0266522 A1 | 11/2006 | Eoff et al. | |
| 2006/0283592 A1 | 12/2006 | Sierra et al. | |
| 2007/0012445 A1 | 1/2007 | Nguyen et al. | |
| 2007/0029087 A1 | 2/2007 | Nguyen et al. | |
| 2007/0114032 A1 | 5/2007 | Stegent et al. | |
| 2008/0070805 A1 | 3/2008 | Munoz et al. | |
| 2008/0070807 A1 | 3/2008 | Munoz et al. | |
| 2008/0070808 A1 | 3/2008 | Munoz et al. | |
| 2008/0110624 A1 | 5/2008 | Nguyen et al. | |
| 2008/0139411 A1 | 6/2008 | Harris et al. | |
| 2008/0173448 A1 | 7/2008 | Nguyen et al. | |
| 2008/0196897 A1 | 8/2008 | Nguyen | |
| 2010/0276152 A1 | 11/2010 | De Wolf et al. | |
| 2012/0048550 A1 | 3/2012 | Dusterhoft et al. | |

FOREIGN PATENT DOCUMENTS

| | | | |
|---|---|---|---|
| EP | 0 896 122 A2 | 2/1999 | |
| EP | 1 033 378 A1 | 9/2000 | |
| EP | 1 193 365 A1 | 4/2002 | |
| EP | 1193365 A1 | 4/2002 | |
| EP | 1 312 753 A1 | 5/2003 | |
| GB | 2 128 659 A | 5/1984 | |
| GB | 2 221 940 A | 2/1990 | |
| GB | 2335428 A | 9/1999 | |
| WO | WO 93/15164 | 8/1993 | |
| WO | WO99/49183 * | 9/1999 | E21B 43/02 |
| WO | WO 99/49183 | 9/1999 | |
| WO | WO 99/50530 | 10/1999 | |
| WO | WO 00/78890 | 12/2000 | |
| WO | WO 02/097236 A1 | 12/2002 | |
| WO | WO 03/056130 | 7/2003 | |
| WO | WO 2004/0022667 | 3/2004 | |
| WO | WO 2004/094781 | 11/2004 | |
| WO | WO 2004/101706 A1 | 11/2004 | |

OTHER PUBLICATIONS

Botermans, C. Wouter, et al, *Relative Permeability Modifiers: Myth or Reality?*, SPE No. 68973, 2001, Society of Petroleum Engineers, Inc., presented at SPE European Formation Damage Conference, The Hague, The Netherlands, May 21-22, pp. 1-13.

Eoff, Larry, et al, *Structure and Process Optimization for the Use of a Polymeric Relative-Permeability Modifier in Conformance Control*, SPE No. 64985, 2001, Society of Petroleum Engineers, Inc., presented at SPE International Symposium on Oilfield Chemistry, Houston, TX, Feb. 13-16, pp. 1-14.

Inikori, Solomon Ovueferaye,*Numerical Study of Water Coning Control with Downhole Water Sink (DWS) Well Completions in Vertical and Horizontal Wells*, A Dissertation, Aug. 2002, Title Page, Contents, Abstract and pp. 17-18, Submitted to the Graduate Faculty of the Louisiana State University and Agricultural and Mechanical College, The Department of Petroleum Engineering.

Zhou, Z. J., et al, *Controlling Formation Damage Using Clay Stabilizers: A Review*, Paper 95-71, The Petroleum Society of CIM, 1995, presented at the 46th Annual Technical Meeting of the Petroleum Society of CIM in Banff, Alberta, Canada, May 14-17.

Halliburton, 2001 Press Releases, *Halliburton Technology Uses Revolutionary Polymer System to Control Unwanted Water Production*, 2002 Halliburton, pp. 1-2, printed from website @ www.halliburton.com/news/archive/2001/esgnws_053101.jsp?printMe.

Halliburton, 2001 Press Releases, *First Halliburton H2Zero™ Conformance Solution Job Performed for a Producing Well in Egypt*, 2002 Halliburton, pp. 1-2, printed from website @ www.halliburton.com/news/archive/2001/esgnws_111901.jsp.

Halliburton, 2001 Press Releases, *Halliburton Performs First H2Zero™ Conformance Solution Job in North America*, 2002 Halliburton, pp. 1-2, printed from website 169 www.halliburton.com/news/archive/2001/esgnws_082201.jsp.

BJ Services Company, *Aquacon, Product Information*, Aug. 1, 2001, pp. 1-2.

BJ Services Company, *Aquatrol I, Product Information*, Dec. 14, 2000, pp. 1-2.

U.S. Appl. No. 11/183,028, filed Jul. 15, 2005, Nguyen, et al.

Xu, et al.., Modeling of Laser Spallation Drilling of Rocks for Gas- And Oilwell Drilling, SPE 95746, 2005.

Gahan, et al., Effect of Downhole Pressure Conditions on High-Power Laser Perforation, SPE 97093, 2005.

Gahan, et al., Analysis of Efficient High-Power Fiber Lasers of Well Perforation, SPE 90661, 2004.

Parker, et al., Well Perforation Using High-Power Lasers, SPE 84418, 2003.

Parker, et al., Laser Drilling: Effffects of Beam Application Methods on Improving Rock Removal, SPE 84353, 2003.

Bai, et al., Improved Determination of Stree-Dependent Permeability for Anisotropic Formations, SPE 78188, 2002.

Proett, et al., Advanced Permeability and Anisotropy Measurements While Testing and Sampling in Real-Time Using a Dual Probe Formation Tester, SPE 62919, 2000.

Proett, et al., Advanced Dual Probe Formation Tester With Transient, Harmonic, and Pulsed Time-Delay Testing Methods Determines Permeability, Skin and Anisotropy, SPE 64650, 2000.

U.S. Appl. No. 11/102,062, filed Apr. 8, 2005, Sierra, et al.

Foreign Communication from a related counterpart application, Oct. 9, 2007.

(56) References Cited

OTHER PUBLICATIONS

Batarseh, et al., *Well Perforation Using High-Power Lasers*, SPE 84418, Society of Petroleum Engineers Inc., presented at the SPE Annual Technical Conference and Exhibition held in Denver, Colorado, Oct. 5-8, 2003.
Notice of Allowance from U.S. Appl. No. 10/881,198, May 25, 2006.
Office Action from U.S. Appl. No. 10/760,443, Aug. 8, 2007.
Office Action from U.S. Appl. No. 10/760,443, Feb. 1, 2007.
Office Action from U.S. Appl. No. 10/760,443, Oct. 6, 2006.
Office Action from U.S. Appl. No. 10/760,443, Mar. 23, 2006.
Office Action from U.S. Appl. No. 10/760,443, Jun. 30, 2005.
Notice of Allowance from U.S. Appl. No. 10/612,271, Mar. 23, 2006.
Office Action from U.S. Appl. No. 10/612,271, May 5, 2005.
Office Action from U.S. Appl. No. 11/122,836, Nov. 14, 2007.
Office Action from U.S. Appl. No. 11/122,836, May 1, 2007.
Office Action from U.S. Appl. No. 10/440,337, Nov. 15, 2006.
Office Action from U.S. Appl. No. 10/440,337, May 3, 2006.
Office Action from U.S. Appl. No. 10/440,337, Jan. 13, 2006.
Office Action from U.S. Appl. No. 10/440,337, Oct. 6, 2005.
Notice of Allowance from U.S. Appl. No. 10/893,210, Mar. 5, 2007.
Notice of Allowance from U.S. Appl. No. 10/893,210, Feb. 27, 2007.
Office Action from U.S. Appl. No. 10/893,210, Sep. 12, 2006.
Office Action from U.S. Appl. No. 11/471,148, Jan. 14, 2008.
Advisory Action from U.S. Appl. No. 11/471,148, Nov. 2, 2007.
Office Action from U.S. Appl. No. 11/471,148, Sep. 20, 2007.
Office Action from U.S. Appl. No. 11/471,148, Apr. 5, 2007.
Office Action from U.S. Appl. No. 11/471,738, Jan. 14, 2008.
Advisory Action from U.S. Appl. No. 11/471,738, Nov. 2, 2007.
Office Action from U.S. Appl. No. 11/471,738, Sep. 20, 2007.
Office Action from U.S. Appl. No. 11/471,738, Apr. 6, 2007.
Notice of Allowance from U.S. Appl. No. 10/236,722, Mar. 23, 2006.
Office Action from U.S. Appl. No. 10/236,722, Sep. 28, 2005.
Advisory Action U.S. Appl. No. 10/236,722, Jul. 5, 2005.
Office Action from U.S. Appl. No. 10/236,722, Apr. 19, 2005.
Office Action from U.S. Appl. No. 10/236,722, Oct. 20, 2004.
Office Action from U.S. Appl. No. 10/862,132, Sep. 24, 2007.
Office Action from U.S. Appl. No. 10/862,132, Jul. 12, 2007.
Office Action from U.S. Appl. No. 10/862,132, Jan. 22, 2007.
Office Action from U.S. Appl. No. 10/862,132, Jul. 28, 2006.
Office Action from U.S. Appl. No. 10/806,894, Dec. 28, 2007.
Office Action from U.S. Appl. No. 10/806,894, Jul. 12, 2007.
Advisory Action from U.S. Appl. No. 10/806,894, Apr. 9, 2007.
Office Action from U.S. Appl. No. 10/806,894, Jan. 3, 2007.
Office Action from U.S. Appl. No. 10/806,894, Jul. 3, 2006.
Notice of Allowance from U.S. Appl. No. 10/825,001, Jul. 18, 2006.
Office Action from U.S. Appl. No. 10/825,001, Jan. 6, 2006.
Office Action dated Mar. 26, 2008 from U.S. Appl. No. 10/862,132.
Office Action dated Mar. 26, 2008 from U.S. Appl. No. 11/360,215.
Office Action dated Apr. 3, 2008 from U.S. Appl. No. 10/760,443.
Office Action dated Feb. 1, 2008 from U.S. Appl. No. 10/440,337.
U.S. Appl. No. 12/080,647, filed Apr. 4, 2008.
Office Action dated Jun. 13, 2008 from U.S. Appl. No. 10/806,894.
Office Action from U.S. Appl. No. 11/485,199 mailed Sep. 24, 2008.
Office Action from U.S. Appl. No. 11/501,595 mailed Sep. 24, 2008.
Office Action from U.S. Appl. No. 10/440,337 mailed Sep. 25, 2008.
Notice of Allowance and Notice of Allowability for U.S. Appl. No. 11/471,738, dated May 28, 2009.
Office Action mailed Nov. 17, 2008, for U.S. Appl. No. 11/471,148.
Office Action mailed Nov. 18, 2008, for U.S. Appl. No. 11/122,836.
Office Action mailed Nov. 18, 2008, for U.S. Appl. No. 11/471,738.
Office Action for U.S. Appl. No. 11/122,836 dated May 13, 2009.
Notice of Allowance and Notice of Allowability for U.S. Appl. No. 11/471,148.
Office Action for U.S. Appl. No. 10/806,894, mailed Dec. 17, 2008.
Office Action for U.S. Appl. No. 10/760,443, mailed Dec. 23, 2008.
Office Action for U.S. Appl. No. 10/862,132, dated Apr. 28, 2009.
Office Action for U.S. Appl. No. 11/360,215, dated Apr. 28, 2009.
Office Action for U.S. Appl. No. 11/485,199, dated Apr. 28, 2009.
Office Action for U.S. Appl. No. 10/806,894 dated Jul. 10, 2009.
Office Action for U.S. Appl. No. 11/501,595 dated Aug. 17, 2009.
Office Action mailed Oct. 31, 2008, for U.S. Appl. No. 10/862,132.
Office Action for U.S. Appl. No. 11/485,199 dated Nov. 18, 2009.
Office Action for U.S. Appl. No. 11/360,215, dated Dec. 7, 2009.
Office Action for U.S. Appl. No. 10/862,132 dated Dec. 30, 2009.
Office Action for U.S. Appl. No. 11/501,595 dated Feb. 5, 2010.
Notice of Allowance for U.S. Appl. No. 10/760,443 dated Feb. 8, 2010.
Office Action for U.S. Appl. No. 11/122,836 dated Feb. 22, 2010.
Office Action for U.S. Appl. No. 10/806,894 dated Apr. 1, 2010.
Office Action for U.S. Appl. No. 10/862,132 dated Apr. 1, 2010.
Office Action for U.S. Appl. No. 11/360,215 dated Jun. 9, 2010.
Office Action for U.S. Appl. No. 11/501,595 dated Jun. 29, 2010.
Office Action for U.S. Appl. No. 11/122,836 dated Jul. 22, 2010.
Office Action for U.S. Appl. No. 10/806,894 dated Oct. 5, 2010.
Office Action for U.S. Appl. No. 11/485,199 dated Sep. 8, 2010.
Office Action for U.S. Appl. No. 11/360,215 dated Sep. 8, 2010.
Office Action for U.S. Appl. No. 12/533,150 dated Jan. 7, 2011.
Office Action for U.S. Appl. No. 11/501,595 dated Feb. 8, 2011.
Office Action for U.S. Appl. No. 11/360,215 dated Feb. 8, 2011.
Office Action for U.S. Appl. No. 11/485,199 dated Feb. 8, 2011.
Office Action for U.S. Appl. No. 10/806,894 dated Mar. 17, 2011.
Office Action for U.S. Appl. No. 12/533,150 dated Jun. 10, 2011.
Office Action for U.S. Appl. No. 11/122,836 dated Apr. 29, 2011.
Office Action for U.S. Appl. No. 11/501,595 dated Jun. 27, 2011.
Office Action for U.S. Appl. No. 11/360,215 dated Jul. 5, 2011.
Office Action for U.S. Appl. No. 11/485,199 dated Jul. 27, 2011.
Office Action for U.S. Appl. No. 11/360,215 dated Sep. 17, 2008.

* cited by examiner

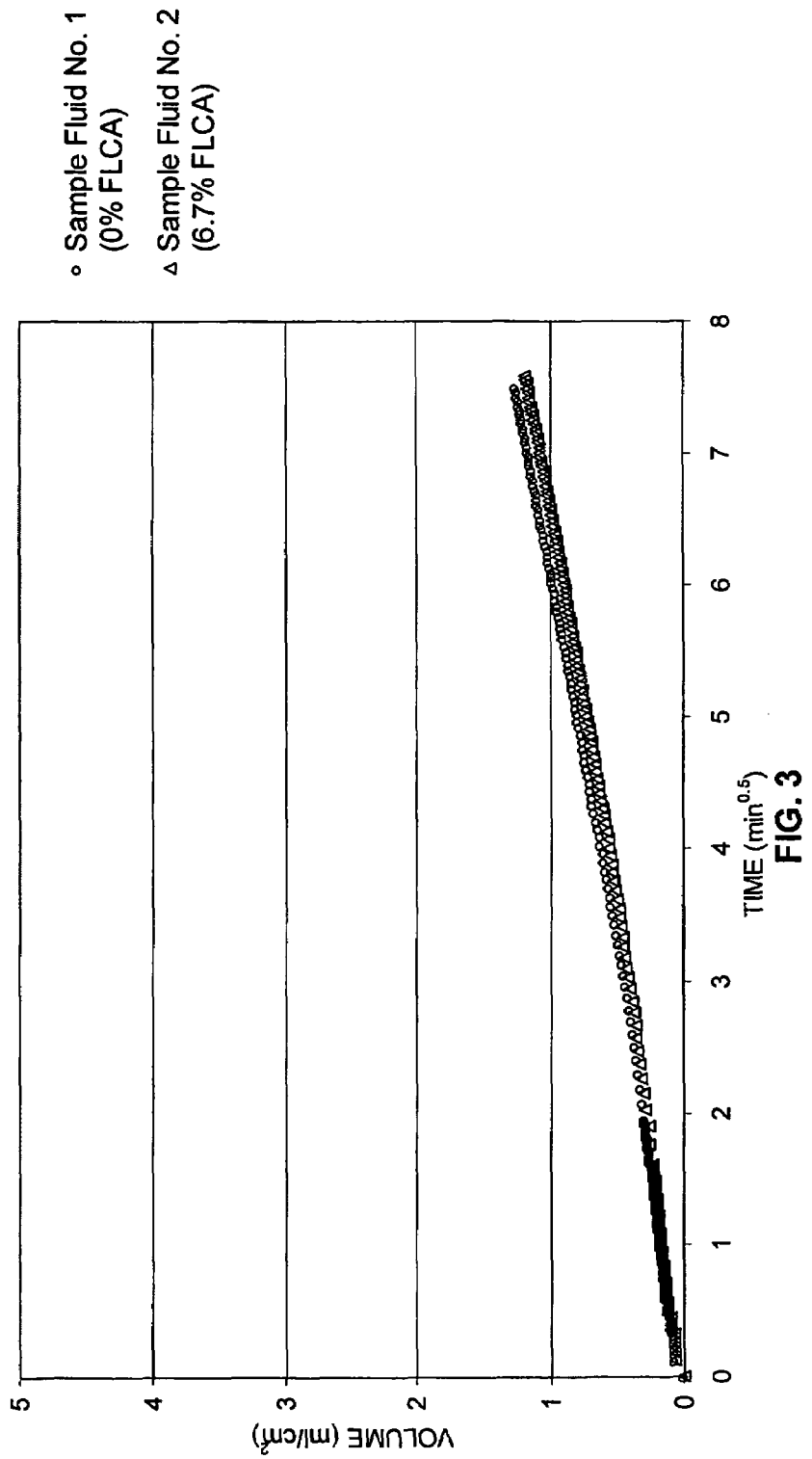

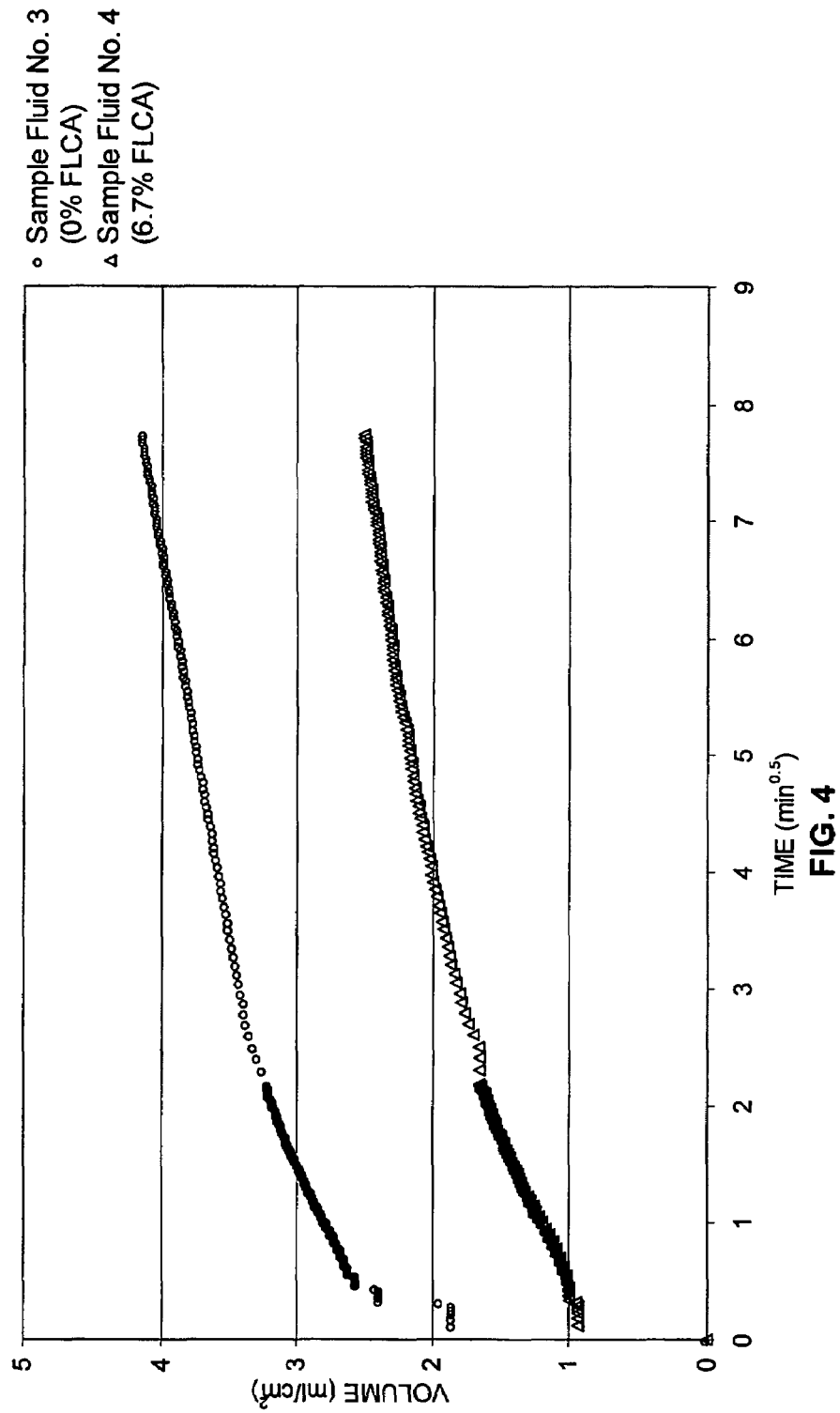

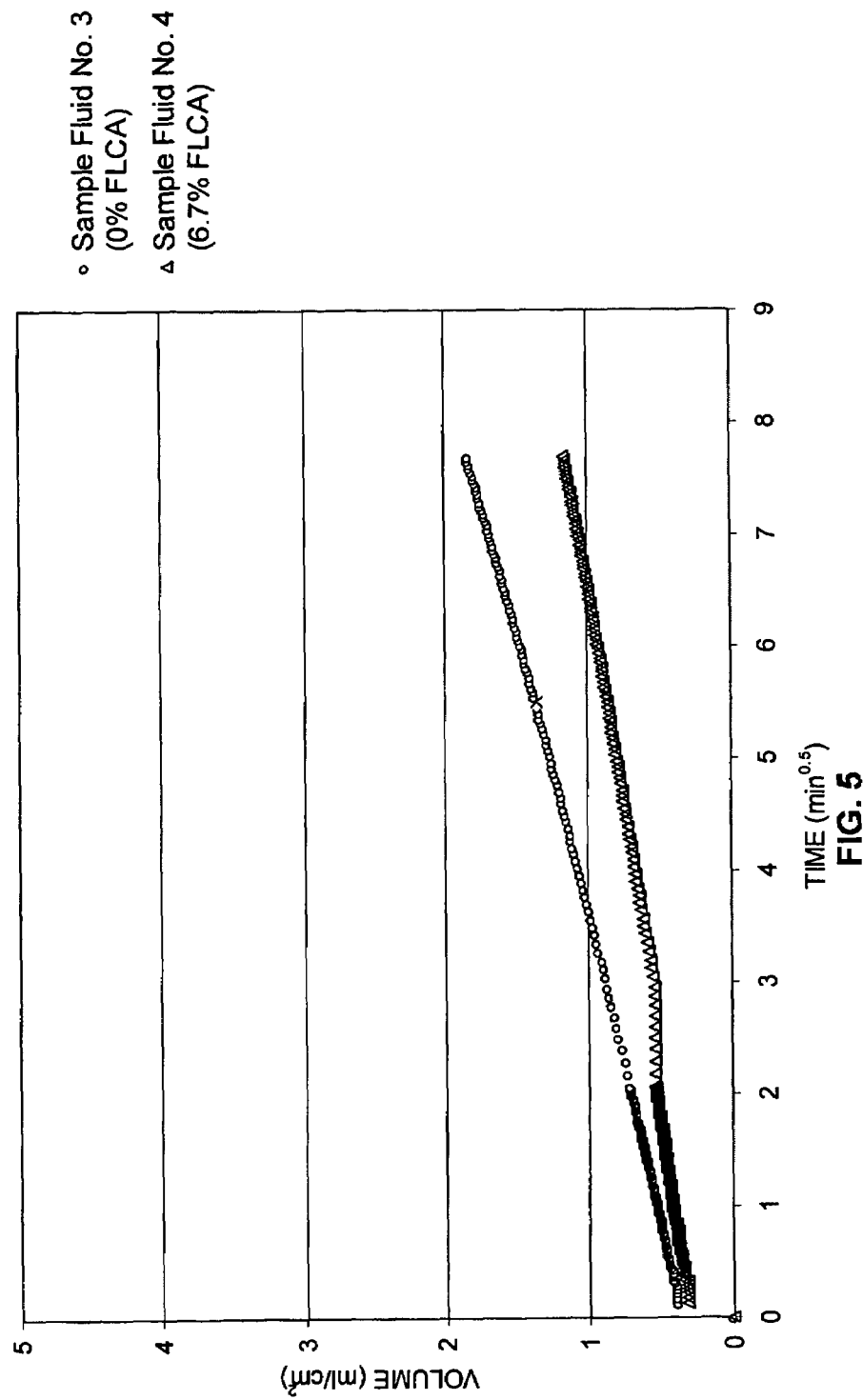

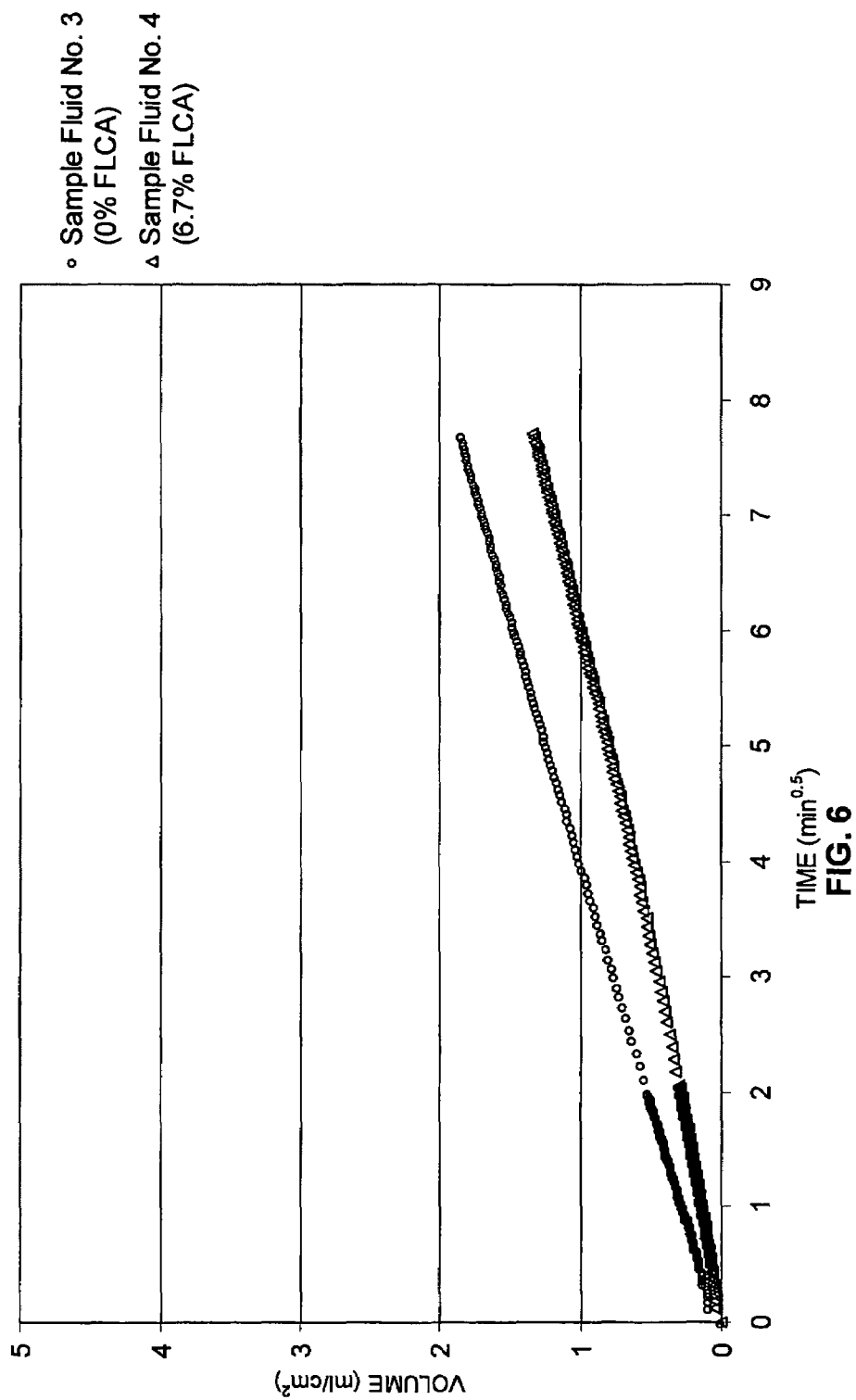

METHODS USEFUL FOR CONTROLLING FLUID LOSS IN SUBTERRANEAN TREATMENTS

CROSS-REFERENCE TO RELATED APPLICATION

This application is a continuation-in-part of U.S. application Ser. No. 10/881,198 filed on Jun. 29, 2004, now U.S. Pat. No. 7,117,942, and U.S. patent application Ser. No. 10/760,443 filed on Jan. 20, 2004, which is a continuation-in-part of U.S. application Ser. No. 10/440,337 filed on May 16, 2003, and U.S. application Ser. No. 10/612,271 filed on Jul. 2, 2003, now U.S. Pat. No. 7,182,136, the entire disclosures of which are incorporated by reference.

BACKGROUND

The present invention relates to subterranean treatments and, more particularly, to using fluid loss control additives that comprise a water-soluble polymer with hydrophobic or hydrophilic modification.

A problem often encountered during subterranean treatments is the undesired loss or leak off of fluid into the formation. This undesired loss or leak off is commonly referred to as "fluid loss." Such treatments include, but are not limited to, drilling operations, cleanup operations, workover operations, completion operations, stimulation treatments (e.g., fracturing, acidizing), and sand control treatments (e.g., gravel packing). In fracturing treatments, fluid loss into the formation may result in a reduction in fluid efficiency, such that the fracturing fluid cannot propagate the fracture as desired. As used herein, the term "treatment," or "treating," refers to any subterranean treatment that uses a fluid in conjunction with a desired function and/or for a desired purpose. The term "treatment," or "treating," does not imply any particular action by the fluid or any particular component thereof.

Fluid loss into the formation may result from a number of downhole conditions, such as high-formation permeability, overbalance pressures, perforated or open-hole intervals in the well bore, and large differential pressures associated with differential segregation in wells completed in a multilayer reservoir. In some instances, the fluid loss may be into a low-pressure portion of the formation due to overbalance pressures, for example, where a well is completed in a multilayer reservoir.

Traditional methods of combating fluid loss may involve mechanical or chemical isolation of the portions of the subterranean formation into which fluid loss occurs. However, in certain subterranean treatments (e.g., workover operations), the mechanical completion itself may not allow for such isolation to occur. In some instances, the use of low-density fluids, such as hydrocarbon-based fluids or foamed fluids, may be used to combat fluid loss into the formation. However, in some instances, well conditions may not allow for the use of hydrocarbon-based fluids, for instance, due to the hydrostatic pressures associated with the hydrocarbon-based fluids. Furthermore, the use of foamed fluids may add undesired expense and complexity to the well bore cleanup operation, as well as additional safety considerations.

In other instances, to prevent fluid loss from occurring, fluid loss control additives commonly may be included in the treatment fluids. Examples of commonly used fluid loss control additives include, but are not limited to, gelling agents, such as hydroxyethylcellulose and xanthan. Additional fluid loss control may be provided by crosslinking the gelling agent or by including fluid loss control materials, such as sized solids (e.g., calcium carbonate), silica particles, oil-soluble resins, and degradable particles, in the treatment fluids. The fluid loss control materials may be used in combination with or separately from the conventional fluid loss control additives. These conventional methods commonly work at the well bore and/or formation face and if they invade the reservoir, formation damage may occur. Additionally, the use of crosslinked fluids may impact fracture geometry, for example, creating wider, shorter fractures. Further, the crosslinked fluids may form a filter cake, which may be detrimental to the production of reservoir fluids.

Chemical fluid loss control pills also may be used to combat fluid loss. Conventional chemical fluid loss control pills may be characterized as either solids-containing pills or solids-free pills. Examples of solids-containing pills include sized-salt pills and sized-carbonate pills. These solids-containing pills often are not optimized for the particular downhole hardware and conditions that may be encountered. For instance, the particle sizes of the solids may not be optimized for a particular application and, as a result, may increase the risk of invasion into the interior of the formation matrix, which may greatly increase the difficulty of removal by subsequent remedial treatments. Additionally, high-solids loading in the pills, in conjunction with the large volumes of these pills needed to control fluid losses, may greatly increase the complexity of subsequent cleanup. Furthermore, high loading of starches and biopolymers in the sized salt pills may add to the difficulty of cleanup either by flow back or remedial treatments. Solids-free fluid loss control pills commonly comprise hydrated polymer gels that may not be effective without some invasion into the formation matrix. These pills typically require large volumes to control fluid loss and remedial treatments to remove.

Once fluid loss control is no longer required, for example, after completing a treatment, remedial treatments may be required to remove the previously placed pills, inter alia, so that the wells may be placed into production. For example, a chemical breaker, such as an acid, oxidizer, or enzyme may be used to either dissolve the solids or reduce the viscosity of the pill. In many instances, however, use of a chemical breaker to remove the pill from inside the well bore and/or the formation matrix may be either ineffective or not a viable economic option. Furthermore, the chemical breakers may be corrosive to downhole tools. Additionally, as the chemical breakers leak off into the formation, they may carry undissolved fines that may plug and/or damage the formation or may produce undesirable reactions with the formation.

SUMMARY

The present invention relates to subterranean treatments and, more particularly, to using fluid loss control additives that comprise a water-soluble polymer with hydrophobic or hydrophilic modification.

An embodiment of the present invention provides a method of providing at least some degree of fluid loss control during a subterranean treatment. In an example of such a method, the method may comprise providing a treatment fluid comprising an aqueous liquid and a fluid loss control additive, the fluid loss control additive comprising a water-soluble polymer with hydrophobic or hydrophilic modification; and introducing the treatment fluid into a well bore that penetrates a subterranean formation, wherein there is at least a partial reduction in fluid loss into at least a portion of the subterranean formation from the treatment fluid and/or another aqueous fluid introduced into the well bore subsequent to the treatment fluid.

Another embodiment of the present invention provides a method of providing at least some degree of fluid loss control during a fracturing treatment. In an example of such a method, the method may comprise providing a fracturing fluid comprising an aqueous liquid and a fluid loss control additive, the fluid loss control additive comprising a water-soluble polymer with hydrophobic or hydrophilic modification; and contacting a subterranean formation with the fracturing fluid at a pressure sufficient to create or enhance one or more fractures in the subterranean formation, wherein there is at least a partial reduction in fluid loss from the fracturing fluid into at least a portion of the subterranean formation.

Another embodiment of the present invention provides a method of providing at least some degree of fluid loss control during a subterranean treatment. In an example of such a method, the method may comprise providing a treatment fluid comprising an aqueous liquid and a fluid loss control additive, the fluid loss control additive comprising a water-soluble hydrophobically modified polymer, wherein the hydrophobically modified polymer comprises an amino methacrylate/alkyl amino methacrylate copolymer; and introducing the treatment fluid into a well bore that penetrates a subterranean formation, wherein there is at least a partial reduction in fluid loss into at least a portion of the subterranean formation from the treatment fluid and/or another aqueous fluid introduced into well bore subsequent to the treatment fluid.

Other and further features and advantages of the present invention will be readily apparent to those skilled in the art upon a reading of the description of the preferred embodiments that follows.

DRAWINGS

A more complete understanding of the present disclosure and advantages thereof may be acquired by referring to the following description taken in conjunction with the accompanying drawings, wherein:

FIG. 3 is a plot of fluid loss volume per time for a dynamic fluid loss test performed using a round cell containing an Ohio sandstone core and various sample fluids.

FIG. 4 is a plot of fluid loss volume per time for a dynamic fluid loss test performed using a round cell containing a H.P. Berea sandstone core and various sample fluids.

FIG. 5 is a plot of fluid loss volume per time for a dynamic fluid loss test performed using a round cell containing a L.P. Berea sandstone core and various sample fluids.

FIG. 6 is a plot of fluid loss volume per time for a dynamic fluid loss test performed using a round cell containing an Ohio sandstone core and various sample fluids.

Figure 1:
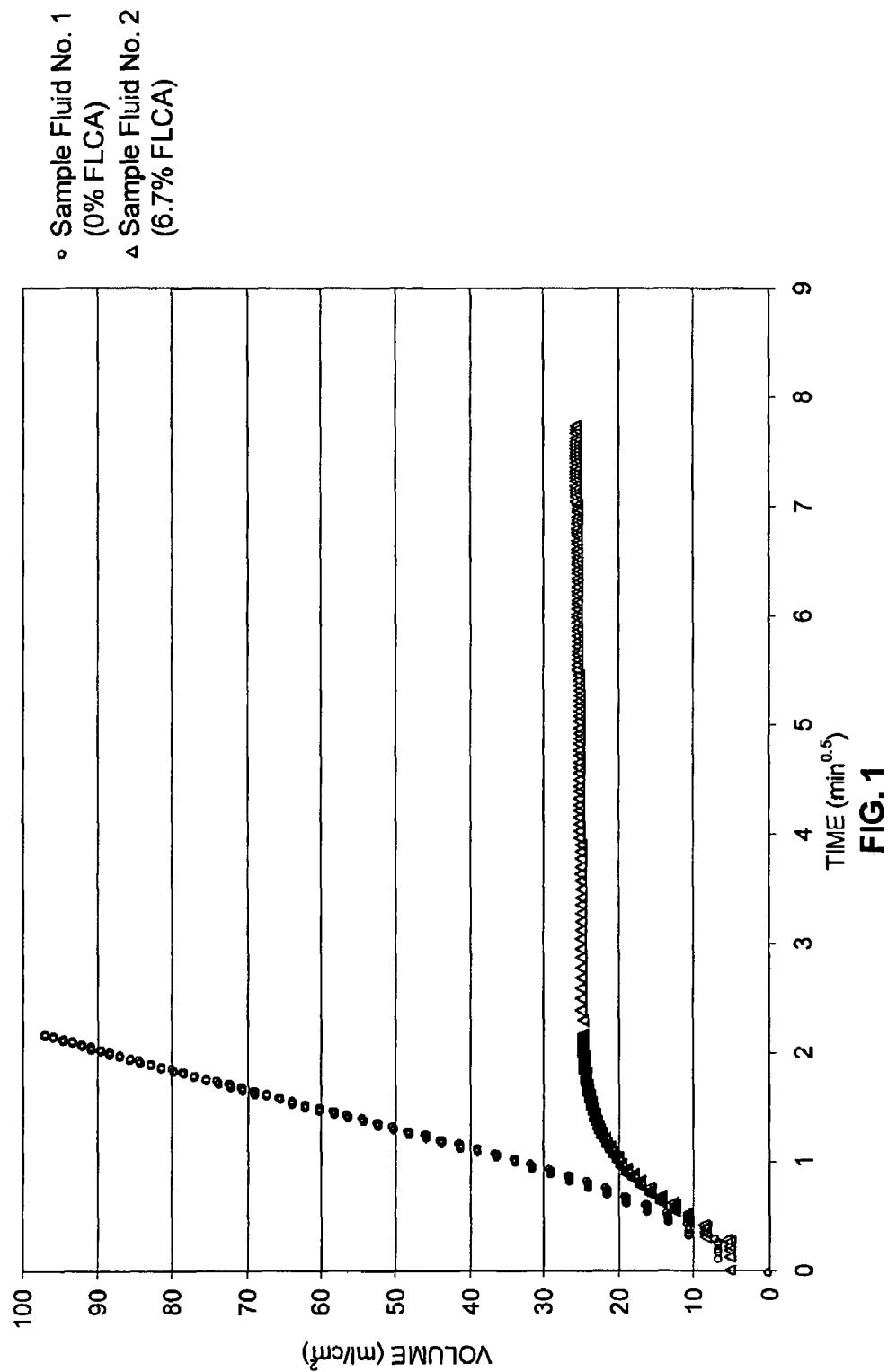
FIG. 1 is a plot of fluid loss volume per time for a dynamic fluid loss test performed using a round cell containing a H.P. Berea sandstone core and various sample fluids.

While the present invention is susceptible to various modifications and alternative forms, specific exemplary embodiments thereof have been shown by way of example in the drawings and are herein described in detail. It should be understood, however, that the description herein of specific embodiments is not intended to limit or define the invention to the particular forms disclosed, but on the contrary, the intention is to cover all modifications, equivalents, and alternatives falling within the spirit and scope of the invention as defined by the appended claims. The figures should in no way be used to limit the meaning of the claim terms.

DESCRIPTION OF PREFERRED EMBODIMENTS

The present invention relates to subterranean treatments and, more particularly, to using fluid loss control additives that comprise a water-soluble polymer with hydrophobic or hydrophilic modification. As used herein, "water-soluble" refers to at least 0.01 weight percent soluble in distilled water. As used herein, the phrase "hydrophobically modified," or "hydrophobic modification," refers to the incorporation into the hydrophilic polymer structure of hydrophobic groups, wherein the alkyl chain length is from about 4 to about 22 carbons. As used herein, the phrase "hydrophilically modified," or "hydrophilic modification," refers to the incorporation into the hydrophilic polymer structure of hydrophilic groups, such as to introduce branching or to increase the degree of branching in the hydrophilic polymer. The methods and compositions of the present invention may be utilized in horizontal, vertical, inclined, or otherwise formed portions of wells.

The treatment fluids of the present invention generally comprise an aqueous liquid and a fluid loss control additive that comprises a water-soluble polymer with hydrophobic or hydrophilic modification. A variety of additional additives suitable for use in the chosen treatment may be included in the treatment fluids as desired. The aqueous liquid of the treatment fluids of the present invention may include freshwater, saltwater, brine (e.g., saturated saltwater), or seawater. Generally, the aqueous liquid may be from any source, provided that it does not contain components that may adversely affect other components in the treatment fluid.

Generally, the fluid loss control additives used in the treatment fluids of the present invention comprise a water-soluble polymer with hydrophobic or hydrophilic modification. A water-soluble polymer with hydrophobic modification is referred to as hydrophobically modified. A water-soluble polymer with hydrophilic modification is referred to as hydrophilically modified. Among other things the fluid loss control additives should reduce fluid loss from the treatment fluid or any other aqueous fluids subsequently introduced into the well bore. It is believed that after leak off into the porosity of the subterranean formation, the water-soluble polymer should attach to surfaces within the porosity of the subterranean formation, thereby reducing the permeability of the subterranean formation to aqueous fluids without substantially changing its permeability to hydrocarbons.

The hydrophobically modified polymers useful in the present invention typically have molecular weights in the range of from about 100,000 to about 10,000,000. While these hydrophobically modified polymers have hydrophobic groups incorporated into the hydrophilic polymer structure, they should remain water-soluble. In some embodiments, a mole ratio of a hydrophilic monomer to the hydrophobic compound in the hydrophobically modified polymer is in the range of from about 99.98:0.02 to about 90:10, wherein the hydrophilic monomer is a calculated amount present in the hydrophilic polymer. In certain embodiments, the hydrophobically modified polymers may comprise a polymer backbone that comprises polar heteroatoms. Generally, the polar heteroatoms present within the polymer backbone of the hydrophobically modified polymers include, but are not limited to, oxygen, nitrogen, sulfur, or phosphorous.

The hydrophobically modified polymers may be synthesized utilizing any suitable method. In one example, the hydrophobically modified polymers may be a reaction product of a hydrophilic polymer and a hydrophobic compound. In another example, the hydrophobically modified polymers may be prepared from a polymerization reaction comprising a hydrophilic monomer and a hydrophobically modified hydrophilic monomer. Those of ordinary skill in the art, with the benefit of this disclosure, will be able to determine other suitable methods for the synthesis of suitable hydrophobically modified polymers.

In certain embodiments, suitable hydrophobically modified polymers may be synthesized by the hydrophobic modification of a hydrophilic polymer. The hydrophilic polymers suitable for forming the hydrophobically modified polymers used in the present invention should be capable of reacting with hydrophobic compounds. Suitable hydrophilic polymers include, homo-, co-, or terpolymers such as, but not limited to, polyacrylamides, polyvinylamines, poly(vinylamines/vinyl alcohols), alkyl acrylate polymers in general, and derivatives thereof. Additional examples of alkyl acrylate polymers include, but are not limited to, polydimethylaminoethyl methacrylate, polydimethylaminopropyl methacrylamide, poly(acrylamide/dimethylaminoethyl methacrylate), poly(methacrylic acid/dimethylaminoethyl methacrylate), poly(2-acrylamido-2-methyl propane sulfonic acid/dimethylaminoethyl methacrylate), poly(acrylamide/dimethylaminopropyl methacrylamide), poly(acrylic acid/dimethylaminopropyl methacrylamide), and poly(methacrylic acid/dimethylaminopropyl methacrylamide). In certain embodiments, the hydrophilic polymers comprise a polymer backbone and reactive amino groups in the polymer backbone or as pendant groups, the reactive amino groups capable of reacting with hydrophobic compounds. In some embodiments, the hydrophilic polymers comprise dialkyl amino pendant groups. In some embodiments, the hydrophilic polymers comprise a dimethyl amino pendant group and a monomer comprising dimethylaminoethyl methacrylate or dimethylaminopropyl methacrylamide. In certain embodiments of the present invention, the hydrophilic polymers comprise a polymer backbone that comprises polar heteroatoms, wherein the polar heteroatoms present within the polymer backbone of the hydrophilic polymers include, but are not limited to, oxygen, nitrogen, sulfur, or phosphorous. Suitable hydrophilic polymers that comprise polar heteroatoms within the polymer backbone include homo-, co-, or terpolymers, such as, but not limited to, celluloses, chitosans, polyamides, polyetheramines, polyethyleneimines, polyhydroxyetheramines, polylysines, polysulfones, gums, starches, and derivatives thereof. In one embodiment, the starch is a cationic starch. A suitable cationic starch may be formed by reacting a starch, such as corn, maize, waxy maize, potato, and tapioca, and the like, with the reaction product of epichlorohydrin and trialkylamine.

The hydrophobic compounds that are capable of reacting with the hydrophilic polymers of the present invention include, but are not limited to, alkyl halides, sulfonates, sulfates, organic acids, and organic acid derivatives. Examples of suitable organic acids and derivatives thereof include, but are not limited to, octenyl succinic acid; dodecenyl succinic acid; and anhydrides, esters, imides, and amides of octenyl succinic acid or dodecenyl succinic acid. In certain embodiments, the hydrophobic compounds may have an alkyl chain length of from about 4 to about 22 carbons. In another embodiment, the hydrophobic compounds may have an alkyl chain length of from about 7 to about 22 carbons. In another embodiment, the hydrophobic compounds may have an alkyl chain length of from about 12 to about 18 carbons. For example, where the hydrophobic compound is an alkyl halide, the reaction between the hydrophobic compound and hydrophilic polymer may result in the quaternization of at least some of the hydrophilic polymer amino groups with an alkyl halide, wherein the alkyl chain length is from about 4 to about 22 carbons.

As previously mentioned, in certain embodiments, suitable hydrophobically modified polymers also may be prepared from a polymerization reaction comprising a hydrophilic monomer and a hydrophobically modified hydrophilic monomer. Examples of suitable methods of their preparation are described in U.S. Pat. No. 6,476,169, the relevant disclosure of which is incorporated herein by reference. The hydrophobically modified polymers synthesized from the polymerization reactions may have estimated molecular weights in the range of from about 100,000 to about 10,000,000 and mole ratios of the hydrophilic monomer(s) to the hydrophobically modified hydrophilic monomer(s) in the range of from about 99.98:0.02 to about 90:10.

A variety of hydrophilic monomers may be used to form the hydrophobically modified polymers useful in the present invention. Examples of suitable hydrophilic monomers include, but are not limited to acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, vinyl acetate, trimethylammoniumethyl methacrylate chloride, methacrylamide, hydroxyethyl acrylate, vinyl sulfonic acid, vinyl phosphonic acid, methacrylic acid, vinyl caprolactam, N-vinylformamide, N,N-diallylacetamide, dimethyldiallyl ammonium halide, itaconic acid, styrene sulfonic acid, methacrylamidoethyltrimethyl ammonium halide, quaternary salt derivatives of acrylamide, and quaternary salt derivatives of acrylic acid.

A variety of hydrophobically modified hydrophilic monomers also may be used to form the hydrophobically modified polymers useful in the present invention. Examples of suitable hydrophobically modified hydrophilic monomers include, but are not limited to, alkyl acrylates, alkyl methacrylates, alkyl acrylamides, alkyl methacrylamides alkyl dimethylammoniumethyl methacrylate halides, and alkyl dimethylammoniumpropyl methacrylamide halides, wherein the alkyl groups have from about 4 to about 22 carbon atoms. In another embodiment, the alkyl groups have from about 7 to about 22 carbons. In another embodiment, the alkyl groups have from about 12 to about 18 carbons. In certain embodiments, the hydrophobically modified hydrophilic monomer comprises octadecyldimethylammoniumethyl methacrylate bromide, hexadecyldimethylammoniumethyl methacrylate bromide, hexadecyldimethylammoniumpropyl methacrylamide bromide, 2-ethylhexyl methacrylate, or hexadecyl methacrylamide.

Suitable hydrophobically modified polymers that may be formed from the above-described reactions include, but are not limited to, acrylamide/octadecyldimethylammoniumethyl methacrylate bromide copolymer, dimethylaminoethyl methacrylate/vinyl pyrrolidone/hexadecyldimethylammoniumethyl methacrylate bromide terpolymer, and acrylamide/2-acrylamido-2-methyl propane sulfonic acid/2-ethylhexyl methacrylate terpolymer. Another suitable hydrophobically modified polymer formed from the above-described reaction comprises an amino methacrylate/alkyl amino methacrylate copolymer. A suitable dimethlyaminoethyl methacrylate/alkyl-dimethylammoniumethyl methacrylate copolymer is a dimethylaminoethyl methacrylate/hexadecyl-dimethylammoniumethyl methacrylate copolymer. As previously discussed, these copolymers may be formed by reactions with a variety of alkyl halides. For example, in some embodiments, the hydrophobically modified polymer may comprise a dimethylaminoethyl methacrylate/hexadecyldimethylammoniumethyl methacrylate bromide copolymer.

In another embodiment of the present invention, the fluid loss control additives of the present invention may comprise a water-soluble hydrophilically modified polymer. The hydrophilically modified polymers of the present invention typically have molecular weights in the range of from about 100,000 to about 10,000,000. In certain embodiments, the hydrophilically modified polymers comprise a polymer backbone that comprises polar heteroatoms. Generally, the polar heteroatoms present within the polymer backbone of the hydrophilically modified polymers include, but are not limited to, oxygen, nitrogen, sulfur, or phosphorous.

The hydrophilically modified polymers may be synthesized utilizing any suitable method. In one example, the hydrophilically modified polymers may be a reaction product of a hydrophilic polymer and a hydrophilic compound. Those of ordinary skill in the art, with the benefit of this disclosure, will be able to determine other suitable methods for the preparation of suitable hydrophilically modified polymers.

In certain embodiments, suitable hydrophilically modified polymers may be formed by additional hydrophilic modification, for example, to introduce branching or to increase the degree of branching, of a hydrophilic polymer. The hydrophilic polymers suitable for forming the hydrophilically modified polymers used in the present invention should be capable of reacting with hydrophilic compounds. In certain embodiments, suitable hydrophilic polymers include, homo-, co-, or terpolymers, such as, but not limited to, polyacrylamides, polyvinylamines, poly(vinylamines/vinyl alcohols), and alkyl acrylate polymers in general. Additional examples of alkyl acrylate polymers include, but are not limited to, polydimethylaminoethyl methacrylate, polydimethylaminopropyl methacrylamide, poly(acrylamide/dimethylaminoethyl methacrylate), poly(methacrylic acid/dimethylaminoethyl methacrylate), poly(2-acrylamido-2-methyl propane sulfonic acid/dimethylaminoethyl methacrylate), poly(acrylamide/dimethylaminopropyl methacrylamide), poly(acrylic acid/dimethylaminopropyl methacrylamide), and poly(methacrylic acid/dimethylaminopropyl methacrylamide). In certain embodiments, the hydrophilic polymers comprise a polymer backbone and reactive amino groups in the polymer backbone or as pendant groups, the reactive amino groups capable of reacting with hydrophilic compounds. In some embodiments, the hydrophilic polymers comprise dialkyl amino pendant groups. In some embodiments, the hydrophilic polymers comprise a dimethyl amino pendant group and at least one monomer comprising dimethylaminoethyl methacrylate or dimethylaminopropyl methacrylamide. In other embodiments, the hydrophilic polymers comprise a polymer backbone that comprises polar heteroatoms, wherein the polar heteroatoms present within the polymer backbone of the hydrophilic polymers include, but are not limited to, oxygen, nitrogen, sulfur, or phosphorous. Suitable hydrophilic polymers that comprise polar heteroatoms within the polymer backbone include homo-, co-, or terpolymers, such as, but not limited to, celluloses, chitosans, polyamides, polyetheramines, polyethyleneimines, polyhydroxyetheramines, polylysines, polysulfones, gums, starches, and derivatives thereof. In one embodiment, the starch is a cationic starch. A suitable cationic starch may be formed by reacting a starch, such as corn, maize, waxy maize, potato, tapioca, and the like, with the reaction product of epichlorohydrin and trialkylamine.

The hydrophilic compounds suitable for reaction with the hydrophilic polymers include polyethers that comprise halogens, sulfonates, sulfates, organic acids, and organic acid derivatives. Examples of suitable polyethers include, but are not limited to, polyethylene oxides, polypropylene oxides, and polybutylene oxides, and copolymers, terpolymers, and mixtures thereof. In some embodiments, the polyether comprises an epichlorohydrin-terminated polyethylene oxide methyl ether.

The hydrophilically modified polymers formed from the reaction of a hydrophilic polymer with a hydrophilic compound may have estimated molecular weights in the range of from about 100,000 to about 10,000,000 and may have weight ratios of the hydrophilic polymers to the polyethers in the range of from about 1:1 to about 10:1. Suitable hydrophilically modified polymers having molecular weights and weight ratios in the ranges set forth above include, but are not limited to, the reaction product of polydimethylaminoethyl methacrylate and epichlorohydrin-terminated polyethyleneoxide methyl ether; the reaction product of polydimethylaminopropyl methacrylamide and epichlorohydrin-terminated polyethyleneoxide methyl ether; and the reaction product of poly(acrylamide/dimethylaminopropyl methacrylamide) and epichlorohydrin-terminated polyethyleneoxide methyl ether. In some embodiments, the hydrophilically modified polymer comprises the reaction product of a polydimethylaminoethyl methacrylate and epichlorohydrin-terminated polyethyleneoxide methyl ether having a weight ratio of polydimethylaminoethyl methacrylate to epichlorohydrin-terminated polyethyleneoxide methyl ether of about 3:1.

Sufficient concentrations of the fluid loss control additives of the present invention should be present in the treatment fluids of the present invention to provide the desired level of fluid loss control. In some embodiments, the fluid loss control additives should be present in the treatment fluids of the present invention in an amount in the range of from about 0.02% to about 10% by weight of the treatment fluid. In another embodiment, the fluid loss control additive should be present in the treatment fluids of the present invention in an amount in the range of from about 0.05% to about 1.0% by weight of the treatment fluid. In certain embodiments of the present invention, the fluid loss control additive may be provided in a concentrated aqueous solution prior to its combination with the other components necessary to form the treatment fluids of the present invention.

Additional additives may be added to the treatment fluids of the present invention as deemed appropriate for a particular application by one skilled in the art with the benefit of this disclosure. Examples of such additives include, but are not limited to, weighting agents, surfactants, scale inhibitors, antifoaming agents, bactericides, salts, foaming agents, acids, conventional fluid loss control additives, viscosifying agents, crosslinking agents, gel breakers, shale swelling inhibitors, combinations thereof, and the like.

The treatment fluids of the present invention may be used in subterranean treatments where it is desirable to provide fluid loss control. Generally, the fluid loss control additives may be used at any stage of a subterranean treatment. In certain embodiments, the treatment fluid may be a drilling fluid, a fracturing fluid, a workover fluid, a well bore cleanup fluid, a gravel packing fluid, or any other suitable aqueous fluid used in subterranean treatments. In another embodiment, the treatment fluids may be a fluid loss control pill that is introduced into the well bore at any stage of the subterranean treatment. For example, the treatment fluid may be a preflush that is introduced into the well bore prior to the subterranean treatment.

Generally, the methods of the present invention comprise introducing a treatment fluid of the present invention that comprises an aqueous fluid and a fluid loss control additive that comprises a water-soluble polymer with hydrophobic or hydrophilic modification into a well bore that penetrates a subterranean formation so as to reduce fluid loss into at least a portion of the subterranean formation from the treatment fluid or another aqueous fluid introduced into the well bore subsequent to the treatment fluid. Generally, at least a portion treatment fluid should penetrate into the porosity of at least a portion of the subterranean formation at least some depth from the treated surface during normal leak off from the treatment fluid. It is believed that the water-soluble polymer present in the portion of the treatment fluid that leaked off into the formation should attach to surfaces within the porosity of the portion of the subterranean formation. The presence of the water-soluble polymers therein should reduce the permeability of treated portion of the subterranean formation to aqueous fluids without substantially changing the permeability thereof to hydrocarbons. This should reduce fluid loss into the treated portion from the treatment fluid and/or any other aqueous fluids (e.g., workover fluids, cleanup fluids, fracturing fluids, gravel packing fluids, drilling fluids, etc.) subsequently introduced into the well bore. In addition, the water-soluble polymers also may reduce subsequent problems associated with water flowing into the well bore from the treated portion of the subterranean formation. Among other things, subsequent remedial treatments should not be required to remove the water-soluble polymers prior to placing the well into production.

To facilitate a better understanding of the present invention, the following examples of some of the preferred embodiments are given. In no way should the following examples be read to limit, or to define, the scope of the invention.

EXAMPLES

Example 1

A fluid loss control additive useful in the present invention was prepared by mixing 47.7 grams ("g") of deionized water, 0.38 g of (n-hexadecyl)dimethylammonium ethyl methacrylate bromide, and 1.1 g of acrylamide, and sparging with nitrogen for approximately 30 minutes. Thereafter, a polymerization initiator, such as 0.0127 g of 2,2'-azo bis(2-amidinopropane)dihydrochloride was added. The resulting solution was then heated, with stirring, to 110° F. and held for 18 hours to produce a highly viscous polymer solution.

Example 2

A fluid loss control additive useful in the present invention was prepared by mixing 41.2 g of deionized water, 0.06 g of octadecyl methacrylate, 0.45 g of cocoamidopropyl betaine surfactant, and 1.26 g of acrylamide. Thereafter, a polymerization initiator, such as 0.0127 g of 2,2'-azo bis(2-amidinopropane)dihydrochloride was added. The resulting solution was then heated, with stirring, to 110° F. and held for 18 hours to produce a highly viscous polymer solution.

Example 3

A fluid loss control additive useful in the present invention was prepared as follows. First, a polymer was prepared by mixing 1,968 g of deionized water, 105 g of dimethylaminoethyl methacrylate and sparging with nitrogen for 30 minutes. Thereafter, the pH was adjusted to approximately 7.9 with sulfuric acid and a polymerization initiator, such as 0.46 g of 2,2'-azo bis(2-amidinopropane)dihydrochloride was added. The resulting solution was then heated, with stirring, to 110° F. and held for 18 hours to produce poly(dimethylaminoethyl methacrylate).

The poly(dimethylaminoethyl methacrylate) was then hydrophobically modified by adding 71.0 g of it to a 250 ml round flask, followed by 15% NaOH to achieve a pH of approximately 8.9. Next, 54.6 g of water, 0.36 g of C16 alkyl(n-hexadecyl)bromide, and 0.39 g of benzylcetyldimethylammonium bromide surfactant were added to quaternize the poly(dimethylaminoethyl methacrylate) homopolymer and form a dimethylaminoethyl methacrylate/hexadecyl-dimethylammoniumethyl methacrylate copolymer. This mixture was then heated, with stirring, to 140° F. and held for 24 hours to produce a highly viscous polymer solution.

Example 4

Fluid loss control tests were performed using a hollow Berea sandstone core with the following dimensions: 2.75-inch length, 2.5-inch outer diameter, 1-inch inner diameter. The Berea sandstone core was mounted in a cell in which fluids can be pumped through the core in two directions. In one direction, defined as the "production direction," fluid is flowed from the exterior of the core, through the core, and into the hollow interior. Fluid also may be flowed in the direction opposite the production direction so that fluid is flowed from the hollow interior of the core, through the core, and to the exterior of the core. Fluid flowing opposite the production direction represents fluid loss from a well bore into the formation. Two treatment solutions were prepared for this series of tests.

The sample treatment fluid used in Test No. 1 (comparative) was a brine containing 21% potassium chloride by weight. Test No. 1 was performed at room temperature.

The sample treatment fluid used in Tests No. 2 was prepared by adding 0.2% of a fluid loss control additive by weight to a brine containing 21% potassium chloride by weight. Accordingly, the sample treatment fluid used in Test No. 2 comprised 21% of potassium chloride by weight and 0.2% of a fluid loss control additive by weight. The fluid loss control additive was a dimethylaminoethyl methacrylate/hexadecyl-dimethylammoniumethyl methacrylate copolymer prepared as described in Example 3. Test No. 2 was performed at room temperature.

The following procedure was used for this series of tests. For each test, the core experienced a flow sequence of 1) brine, 2) oil (kerosene), 3) drilling mud (to build a filter cake), 4) sample treatment fluid, 5) oil (kerosene). The first flow step, brine, was in the production direction and prepared the core for the test. The brine used in the first flow step was a brine containing 7% potassium chloride by weight. Next, in the second flow step, the kerosene was flowed in the production direction at a constant rate until the pressure stabilized, and the initial permeability of the core was calculated. Thereafter, in the third flow step, a sample drilling mud was placed in the hollow interior of the core and pressure was applied, such that a drilling fluid filter cake was formed on the inner surface of the core. After formation of the drilling fluid filter cake, in the fourth flow step, the sample treatment fluid was placed in the inner hole, and a constant pressure of 120 psi was applied. The filtrate loss from the sample treatment fluid was then measured as a function of time. In the fifth flow step, kerosene was flowed in the production direction at the same rate and the final permeability of the core was calculated. For each series of tests, the initial and final permeability of the core to kerosene was essentially unchanged. Table 1 contains the data for this series of tests.

TABLE 1

| Test | Polymer Concentration | Filtrate Loss (ml) at Given Time (hours) | | | | | | | |
|---|---|---|---|---|---|---|---|---|---|
| | | 1 hr | 3 hrs | 5 hrs | 6.2 hrs | 7 hrs | 7.6 hrs | 7.9 hrs | 8.3 hrs |
| No. 1 @ room temperature | 0 | 1.7 | 2.3 | 3.2 | 3.6 | 10 | 31 | 50 | 80 |
| No. 2 @ room temperature | 2000 ppm | 1.7 | 2.3 | 3.2 | 3.6 | 3.9 | 4.1 | 4.3 | 4.4 |

Accordingly, this example indicates that the above-described fluid loss control additives that comprise hydrophobically modified polymers may be useful for controlling fluid loss from a well bore into a subterranean formation.

Example 5

Permeability reduction tests were performed using two treatment solutions and a multipressure tap Hassler sleeve containing a Brown sandstone core. The Hassler sleeve contained three pressure taps, as well as an inlet and an outlet for determining pressure, thereby dividing the core into four segments. Test No. 3 was performed at 150° F., and Test No. 4 was performed at 175° F.

The sample treatment fluid used in Test No. 3 was prepared by adding 0.6% of a fluid loss control additive by weight to a 2% by weight potassium chloride ("KCl") brine. Thus, the sample treatment fluid used in Test No. 3 comprised 2% of KCl by weight and 0.6% of a fluid loss control additive by weight. The fluid loss control additive was a dimethylaminoethyl methacrylate/hexadecyl-dimethylammoniumethyl methacrylate copolymer prepared as described in Example 3.

The sample treatment fluid used in Test No. 4 was prepared by adding 0.2% of a fluid loss control additive by weight to a 2% by weight KCl brine. Thus, the sample treatment fluid used in Test No. 4 comprised 2% of KCl by weight and 0.2% of a fluid loss control additive by weight. The fluid loss control additive was a dimethylaminoethyl methacrylate/hexadecyl-dimethylammoniumethyl methacrylate copolymer prepared as described in Example 3.

The following procedure was used for this series of tests. For each test, the core experienced a flow sequence of 1) brine, 2) oil (kerosene), 3) brine, 4) sample treatment fluid, 5) brine. The brine used in flow steps 1, 3, and 5 was a brine containing 7% potassium chloride by weight. The first two flow steps of brine and oil prepared the core for the test. The brine flow in step 3 was maintained until the pressure stabilized, yielding an initial permeability for the core, listed in Tables 2 and 3 below as "Initial Core Permeability." Next, 15 ml of the sample treatment fluid were flowed into the core. Next, the brine flow was reestablished until the pressure stabilized to determine the permeability of the core after treatment with the sample treatment fluid, listed in Tables 2 and 3 below as "Final Core Permeability." Initial and Final Core Permeabilities were utilized to determine a percent reduction of water permeability according to the following formula:

% Reduction of Water Permeability=(1−Final Permeability/Initial Permeability)×100

As previously discussed, the multipressure tap Hassler Sleeve divided the core into four segments. For the above-described tests, flow steps 1, 2, 3, and 5 were from segment 1 to segment 4, and flow step 4 was from segment 4 to segment 1. The results of Test No. 3 utilizing a polymer concentration of 6,000 ppm are provided in Table No. 2 below.

TABLE 2

| | Initial Core Permeability (mDarcy) | Final Core Permeability (mDarcy) | % Reduction of Water Permeability |
|---|---|---|---|
| Segment 1 | 371.7 | 328.59 | 12 |
| Segment 2 | 303.56 | 20.08 | 93 |
| Segment 3 | 358.92 | 30.27 | 92 |
| Segment 4 | 96.19 | 1.69 | 98 |
| Total | 241.46 | 8.36 | 97 |

The results of Test No. 4 utilizing a polymer concentration of 2,000 ppm are provided in Table No. 3 below.

TABLE 3

| | Initial Core Permeability (mDarcy) | Final Core Permeability (mDarcy) | % Reduction of Water Permeability |
|---|---|---|---|
| Segment 1 | 2,059.79 | 823.65 | 60 |
| Segment 2 | 4,372.98 | 1,784.29 | 59 |
| Segment 3 | 283.76 | 1.74 | 99 |
| Segment 4 | 5,281.94 | 4.81 | 100 |
| Total | 722.01 | 4.43 | 99 |

Accordingly, Example 5 indicates that the fluid loss control additives useful in the present invention that comprise hydrophobically modified polymers may be useful for controlling fluid loss from a well bore into a subterranean formation.

Example 6

Permeability reduction tests were performed using two treatment solutions and a multipressure tap Hassler sleeve containing a Brown sandstone core. The Hassler sleeve contained three pressure taps, as well as an inlet and an outlet for determining pressure), thereby dividing the core into four segments.

The sample treatment fluid used in Test No. 5 was prepared by adding 0.2% of a fluid loss control additive by weight to a 2% by weight KCl brine. Thus, the sample treatment fluid used in Test No. 4 comprised 2% of KCl by weight and 0.2% of a fluid loss control additive by weight. The fluid loss control additive was a dimethylaminoethyl methacrylate/hexadecyl-dimethylammoniumethyl methacrylate copolymer prepared as described in Example 3. Test No. 5 was performed at 150° F.

The following procedure was used for this series of tests. For each test, the core experienced a flow sequence of 1) brine, 2) oil (kerosene), 3) sample treatment fluid, 4) oil (kerosene). The first flow step of brine prepared the core for the test. The brine used in flow step 1 was a brine containing 7% KCl by weight. The oil flow in step 2 was maintained until the pressure stabilized, yielding an initial permeability for the core, listed in Tables 2 and 3 below as "Initial Core Permeability." Next, the sample treatment fluid was flowed into the core. Next, the oil flow was reestablished until the pressure stabilized to determine the permeability of the core after treatment with the sample treatment fluid, listed in Tables 2 and 3 below as "Final Core Permeability." Initial and Final Core Permeabilities were utilized to determine a percent reduction of oil permeability according to the following formula:

% Reduction of Oil Permeability=(1−Final Permeability/Initial Permeability)×100

As previously discussed, the multipressure tap Hassler Sleeve divided the core into four segments. For the above-described tests, flow steps Nos. 1, 2, and 4 were from segment 1 to segment 4, and flow step No. 3 was from segment 4 to segment 1. The results of Test No. 5 utilizing a polymer concentration of 2,000 ppm are provided in Table No. 4 below.

TABLE 4

|  | Initial Core Permeability (mDarcy) | Final Core Permeability (mDarcy) | % Reduction of Water Permeability |
|---|---|---|---|
| Total | 3,571.5 | 4,725.25 | −32 |

Accordingly, this example indicates that the above-described fluid loss control additives that comprise hydrophobically modified polymers may be useful for controlling fluid loss from a well bore into a subterranean formation.

Example 7

A fluid loss control additive useful in the present invention was prepared as follows. First, a polymer was prepared by mixing 45.0 g of dimethylaminoethyl methacrylate, 6.8 g acrylic acid, 372.0 g of water and sparging with nitrogen for 30 minutes. Thereafter, the pH was adjusted to approximately 5.3 with 5.7 mL of concentrated sulfuric acid, followed by the addition of 0.2 mL of 2-mercaptoethanol and 1.3 g of 2,2'-azo bis(2-amidinopropane) dihydrochloride. The resulting solution was then heated to 71° C., with stirring, and held for 18 hours to produce poly(dimethylaminoethyl methacrylate/acrylic acid).

The poly(dimethylaminoethyl methacrylate/acrylic acid) was then hydrophilically modified by adding 95.0 g of the polymer to a 250 mL roundbottom flask, followed by the addition of 5.7 g of a 65% solution of an epichlorohydrin-terminated polyethylene oxide methyl ether and 8.0 g of sodium chloride. Approximately 17 mL of 3% active sodium hydroxide solution was then added to reach a pH of approximately 8.2. The mixture was then heated, with stirring, to 71° C. The viscosity of the solution was monitored, and when the viscosity reached 2000 centipoise (as measured with a Brookfield LVT viscometer, #2 spindle at 12 rpm, 25° C.) the reaction was terminated by removing the heat source and adding 5 mL of 17% hydrochloric acid, 2.0 g sodium chloride and 14.7 g water.

Example 8

Dynamic fluid loss control tests were performed using four sample fluids and a round cell containing a formation core sample. High Pressure ("HP") Berea Sandstone, Low Pressure ("LP") Berea Sandstone, and Ohio Sandstone core samples were used for this series of tests.

The following procedure was used for this series of tests. The formation core samples were cut for a round core holder and placed into the core holder. The round core holder used a 1.5-inch diameter core. There was a 0.16-inch gap to allow fluid flow through the cell and across the core face for the dynamic test conditions. The round cells were heated to 140° F.

After the round cells were prepared, the sample fluid was pumped through 340 feet of 0.194-inch I.D. tubing to provide preconditioning and shear history for the fluid. The shear rate was approximately 440 sec$^{-1}$ at a pump rate of 0.31 l/min. After exiting this tubing, the sample fluid was pumped into a 0.402-inch I.D. tubing section (110 feet) that was immersed in a heating bath. This simulated the lower shear rate of fluid flow in a fracture. The shear rate was about 50 sec$^{-1}$. For this series of test, the sample fluid was heated to 140° F. as it flowed through this tubing section. After exiting this tubing section, the sample fluid was forced through the heated round cells where the dynamic fluid loss occurred. The gap for fluid flow in the round cell created the same shear rate (50 sec$^{-1}$) as in the previous tubing section. A 1,000-psi pressure differential drives fluid loss through the formation core sample. The fluid loss test was continued for the desired length of time while fluid loss volumes were collected.

Sample Fluid No. 1 (comparative) was a WaterFrac™ 25 fluid system having a gelling agent concentration of 25 pounds per thousand gallons (lbs/mgal). WaterFrac™ 25 is a fluid system that is commercially available from Halliburton Energy Services, Inc., Duncan, Okla. Sample Fluid No. 1 was prepared by adding 25 lbs/mgal of WG-22™ gelling agent to a base fluid. WG-22™ is a guar-based gelling agent that is commercially available from Halliburton Energy Services, Inc., Duncan, Okla. The base fluid was water that contained 2% KCl by weight. Sample Fluid No. 1 had a pH of 8.01. The viscosity of Sample Fluid No. 1 was found to be 17 cP at 74.1° F. on a Fann® Model 35 Viscometer 1/5 spring at 300 rpm.

Sample Fluid No. 2 was prepared by adding 67 gallons per thousand gallons (gal/mgal) of a fluid loss control additive to the WaterFrac™ 25 fluid system of Sample Fluid No. 1. The fluid loss control additive was a dimethylaminoethyl methacrylate/hexadecyl-dimethylammoniumethyl methacrylate copolymer prepared as described in Example 3. Next, the sample was buffered to a pH of 6.09 using BA-20™ buffering agent, which is commercially available from Halliburton Energy Services, Inc., Duncan, Okla. The viscosity of Sample Fluid No. 2 was found to be 19.7 cP at 74.1° F. on a Fann® Model 35 Viscometer 1/5 spring at 300 rpm.

Sample Fluid No. 3 (comparative) was a Delta Frac® 140 25 fluid system having a gelling agent concentration of 25 lbs/mgal. Delta Frac® 140 25 is a fluid system that is commercially available from Halliburton Energy Services, Inc., Duncan, Okla. Sample No. 2 was prepared by adding 25 lbs/mgal of WG-22™ gelling agent to a base fluid. WG-22™ is a guar-based gelling agent that is commercially available from Halliburton Energy Services, Inc., Duncan, Okla. The base fluid was water that contained 2% KCl by weight. The base gel had a pH of 7.72. The viscosity of the base gel was found to be 16.1 cP at 72.3° F. on a Fann® Model 35 Viscometer 1/5 spring at 300 rpm. Next, 2 gals/mgal of BC-2 crosslinking agent was added to the base gel. BC-2 is a borate crosslinking agent that is commercially available from Halliburton Energy Services, Inc., Duncan, Okla. Next, 0.0017 gals/mgal of N-Zyme 3™ breaking agent was added to the base gel. N-Zyme 3™ is a breaking agent that is commercially available from Halliburton Energy Services, Inc., Duncan, Okla. The gelled and crosslinked Sample Fluid No. 3 had a pH of 8.55.

Sample Fluid No. 4 was prepared by adding 67 gal/mgal of a fluid loss control additive to the Delta Frac® 140 25 fluid system of Sample Fluid No. 3. The fluid loss control additive was a dimethylaminoethyl methacrylate/hexadecyl-dimethylammoniumethyl methacrylate copolymer prepared as described in Example 3. Sample Fluid No. 4 had a pH of 8.54. The viscosity of Sample Fluid No. 4 was found to be 16.2 cP at 74.1° F. on a Fann® Model 35 Viscometer 1/5 spring at 300 rpm.

Dynamic fluid loss control tests were conducted in accordance with the above procedure using the H.P. Berea sandstone core sample for both Sample Fluid No. 1 and Sample Fluid No. 2. Table 5 below lists the total fluid loss volume after 4 minutes for each sample. The results of this test are also depicted in FIG. 1.

TABLE 5

| H.P. BEREA SANDSTONE CORE | | |
| --- | --- | --- |
| Fluid | Fluid Loss Control Additive (gals/mgal) | Total Fluid Loss After 4 Minutes (ml/cm$^2$) |
| Sample Fluid No. 1 (WaterFrac ™ 25 Fluid System) | 0 | 86.76 |
| Sample Fluid No. 2 (WaterFrac ™ 25 Fluid System) | 67 | 24.69 |

Figure 2:
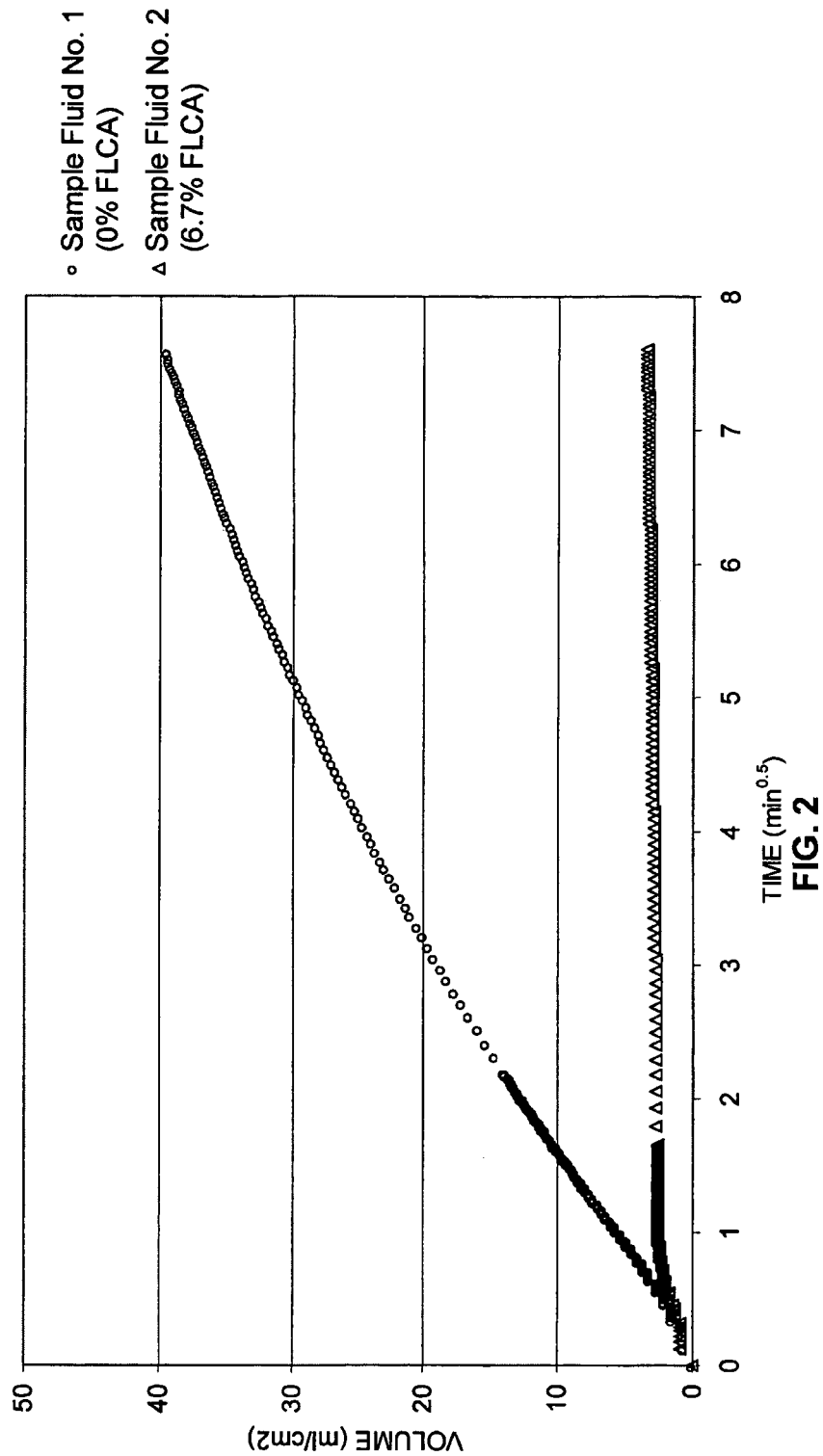
FIG. 2 is a plot of fluid loss volume per time for a dynamic fluid loss test performed using a round cell containing a L.P. Berea sandstone core and various sample fluids.

Dynamic fluid loss control tests were conducted in accordance with the above procedure using the L.P. Berea sandstone core samples for both Sample Fluid No. 1 and Sample Fluid No. 2. Table 6 below lists the total fluid loss volume after 1 hour for each sample. The results of this test are also depicted in FIG. 2.

TABLE 6

| L.P. BEREA SANDSTONE CORE | | |
| --- | --- | --- |
| Fluid | Fluid Loss Control Additive (gals/mgal) | Total Fluid Loss After 1 Hour (ml/cm$^2$) |
| Sample Fluid No. 1 (WaterFrac ™ 25 Fluid System) | 0 | 39.46 |
| Sample Fluid No. 2 (WaterFrac ™ 25 Fluid System) | 67 | 3.42 |

Dynamic fluid loss control tests were conducted in accordance with the above procedure using the Ohio sandstone core sample for both Sample Fluid No. 1 and Sample Fluid No. 2. Table 7 below lists the total fluid loss volume after 1 hour for each sample. The results of this test are also depicted in FIG. 3.

TABLE 7

| OHIO SANDSTONE CORE | | |
| --- | --- | --- |
| Fluid | Fluid Loss Control Additive (gals/mgal) | Total Fluid Loss After 1 Hour (ml/cm$^2$) |
| Sample Fluid No. 1 (WaterFrac ™ 25 Fluid System) | 0 | 1.25 |
| Sample Fluid No. 2 (WaterFrac ™ 25 Fluid System) | 67 | 1.18 |

In addition to the above tests for Sample Fluid No. 1 and No. 2, dynamic fluid loss control tests were also conducted in accordance with the above procedure for Sample Fluid No. 3 and No. 4 on each of the formation core samples. First, the dynamic fluid loss tests were conducted using the H.P. Berea sandstone core sample. Table 8 below lists the total fluid loss volume after 1 hour for each sample. The results of this test are also depicted in FIG. 4.

TABLE 8

| H.P. BEREA SANDSTONE CORE | | |
| --- | --- | --- |
| Fluid | Fluid Loss Control Additive (gals/mgal) | Total Fluid Loss After 1 Hour (ml/cm$^2$) |
| Sample Fluid No. 3 (Delta Frac ® 140 25 Fluid System) | 0 | 4.13 |
| Sample Fluid No. 4 (Delta Frac ® 140 25 Fluid System) | 67 | 2.51 |

Dynamic fluid loss control tests were conducted in accordance with the above procedure using the L.P. Berea sandstone core samples for both Sample Fluid No. 3 and Sample Fluid No. 4. Table 9 below lists the total fluid loss volume after 1 hour for each sample. The results of this test are also depicted in FIG. 5.

TABLE 9

| L.P. BEREA SANDSTONE CORE | | |
| --- | --- | --- |
| Fluid | Fluid Loss Control Additive (gals/mgal) | Total Fluid Loss After 1 Hour (ml/cm$^2$) |
| Sample Fluid No. 3 (Delta Frac ® 140 25 Fluid System) | 0 | 1.83 |
| Sample Fluid No. 4 (Delta Frac ® 140 25 Fluid System) | 67 | 1.16 |

Dynamic fluid loss control tests were conducted in accordance with the above procedure using the Ohio sandstone core sample for both Sample Fluid No. 3 and Sample Fluid No. 4. Table 10 below lists the total fluid loss volume after 1 hour for each sample. The results of this test are also depicted in FIG. 6.

TABLE 10

| OHIO SANDSTONE CORE | | |
| --- | --- | --- |
| Fluid | Fluid Loss Control Additive (gals/mgal) | Total Fluid Loss After 1 Hour (ml/cm$^2$) |
| Sample Fluid No. 1 (WaterFrac ™ 25 Fluid System) | 0 | 1.84 |
| Sample Fluid No. 2 (WaterFrac ™ 25 Fluid System) | 67 | 1.33 |

Accordingly, this Example illustrates that the fluid loss control additives useful in the present invention may be suitable for providing dynamic fluid loss control in a variety of formation rock types and fluid systems.

Therefore, the present invention is well adapted to carry out the objects and attain the ends and advantages mentioned as well as those that are inherent therein. While numerous changes may be made by those skilled in the art, such changes are encompassed within the spirit and scope of this invention as defined by the appended claims. The terms in the claims have their plain, ordinary meaning unless otherwise defined by the patentee.

What is claimed is:

1. A method of providing at least some degree of fluid loss control during a subterranean treatment, comprising:

providing a treatment fluid comprising an aqueous liquid and a fluid loss control additive, the fluid loss control additive comprising a water-soluble polymer having at least one C4 to C22 alkyl hydrophobic modification, wherein the water-soluble polymer comprises a polymer backbone that comprises polar heteroatoms selected from the group consisting of nitrogen, sulfur, and phosphorous, and wherein the water-soluble polymer having at least one C4 to C22 alkyl hydrophobic modification is a reaction product of a reaction comprising a hydrophilic polymer and a hydrophobic compound comprising an alkyl chain length of from about 4 to about 22 carbons and one of a sulfonate and a sulfate, wherein the reaction product has a mole ratio of a hydrophilic monomer to the hydrophobic compound from about 99.98:0.02 to about 90:10, wherein the hydrophilic monomer is a calculated amount present in the hydrophilic polymer; and introducing the treatment fluid into a well bore that penetrates a subterranean formation, wherein there is at least a partial reduction in fluid loss into at least a portion of the subterranean formation from at least the treatment fluid or another aqueous fluid introduced into the well bore subsequent to the treatment fluid.

2. The method of claim 1 wherein the hydrophilic polymer comprises a polymer backbone and a reactive amino group in the polymer backbone or as a pendant group, the reactive amino group capable of reacting with the hydrophobic compound.

3. The method of claim 1 wherein the hydrophilic polymer comprises a dialkyl amino pendant group.

4. The method of claim 1 wherein the hydrophilic polymer comprises a dimethyl amino pendant group.

5. The method of claim 1 wherein the hydrophilic polymer comprises at least one polymer selected from the group consisting of: a polyvinylamine; a poly(vinylamine/vinyl alcohol); a cellulose; a chitosan; a polyamide; a polyetheramine; a polyethyleneimine; a polyhydroxyetheramine; a polylysine; a polysulfone; a gum; a starch; and derivatives thereof.

6. The method of claim 1 wherein the hydrophobic compound further comprises at least one compound selected from the group consisting of: an alkyl halide; an organic acid; and an organic acid derivative.

7. The method of claim 1 wherein at least a portion of the treatment fluid leaks off into the portion of the subterranean formation and the fluid loss control additive present in the portion of the treatment fluid reduces the permeability of the portion of the subterranean formation to aqueous fluids without substantially changing the permeability of the portion to hydrocarbons.

8. A method of providing at least some degree of fluid loss control during a fracturing treatment, comprising:

providing a fracturing fluid comprising an aqueous liquid and a fluid loss control additive, the fluid loss control additive comprising a water-soluble polymer having at least one C4 to C22 alkyl hydrophobic modification, wherein the water-soluble polymer comprises a polymer backbone that comprises polar heteroatoms within a functionality selected from the group consisting of a chitosan, a polyamide, a polyetheramine, a polyethyleneimine, a polyhydroxyetheramine, a polylysine, a polysulfone, and any derivative thereof, and wherein the water- soluble polymer having at least one C4 to C22 alkyl hydrophobic modification is a reaction product of a reaction comprising a hydrophilic polymer and a hydrophobic compound comprising an alkyl chain length of from about 4 to about 22 carbons and one of a sulfonate and a sulfate, wherein the reaction product has a mole ratio of a hydrophilic monomer to the hydrophobic compound from about 99.98:0.02 to about 90:10, wherein the hydrophilic monomer is a calculated amount present in the hydrophilic polymer; and wherein the hydrophobically modified hydrophilic monomer comprises a hydrophobic branch having an alkyl group of from about 4 carbons to about 22 carbons; and contacting a subterranean formation with the fracturing fluid at a pressure sufficient to create or enhance one or more fractures in the subterranean formation, wherein there is at least a partial reduction in fluid loss from the fracturing fluid into at least a portion of the subterranean formation.

* * * * *